(12) United States Patent
Wilson

(10) Patent No.: US 7,320,494 B1
(45) Date of Patent: Jan. 22, 2008

(54) HARDWARE TO FACILITATE STORING PICKUP BED COVER

(76) Inventor: Jerry Wilson, 4218 Dominion Dr., Erie, PA (US) 16510

( * ) Notice: Subject to any disclaimer, the term of this patent is extended or adjusted under 35 U.S.C. 154(b) by 108 days.

(21) Appl. No.: 11/144,548

(22) Filed: Jun. 3, 2005

Related U.S. Application Data

(60) Provisional application No. 60/576,391, filed on Jun. 3, 2004.

(51) Int. Cl.
*B60P 7/02* (2006.01)

(52) U.S. Cl. .......................... 296/100.09; 296/100.07; 296/100.1

(58) Field of Classification Search .......... 296/100.01, 296/100.02, 100.06, 100.08, 100.09, 100.1, 296/100.07, 136.01, 136.03; 105/377.04
See application file for complete search history.

(56) References Cited

U.S. PATENT DOCUMENTS

| | | | | | |
|---|---|---|---|---|---|
| 619,029 | A | * | 2/1899 | Wallace | 105/377.04 |
| 1,186,388 | A | * | 6/1916 | Fountain | 105/377.04 |
| 2,912,276 | A | * | 11/1959 | Schwartz et al. | 296/100.06 |
| 2,989,340 | A | * | 6/1961 | Penner | 296/100.1 |
| 3,051,523 | A | * | 8/1962 | Boyce-Smith et al. | 296/100.1 |
| 3,762,762 | A | * | 10/1973 | Beveridge et al. | 296/100.1 |
| 3,785,698 | A | * | 1/1974 | Dean et al. | 296/100.1 |
| 3,866,972 | A | * | 2/1975 | Reese | 296/100.1 |
| 3,913,969 | A | * | 10/1975 | Hoch | 296/100.1 |
| 3,977,720 | A | * | 8/1976 | Schreiberg | 296/185.1 |
| 3,995,890 | A | * | 12/1976 | Fletcher | 296/10 |
| 4,101,162 | A | * | 7/1978 | Koehn | 296/100.1 |
| 4,277,098 | A | * | 7/1981 | Gibney | 296/100.09 |
| 4,313,636 | A | * | 2/1982 | Deeds | 296/100.09 |
| 4,324,429 | A | * | 4/1982 | Wilson et al. | 296/100.1 |
| 4,418,954 | A | * | 12/1983 | Buckley | 296/100.09 |
| 4,747,441 | A | * | 5/1988 | Apolzer et al. | 160/206 |
| 4,789,197 | A | * | 12/1988 | Lewis | 296/100.04 |
| 4,815,786 | A | * | 3/1989 | McRay | 296/165 |
| 4,824,162 | A | * | 4/1989 | Geisler et al. | 296/100.09 |
| 4,844,531 | A | * | 7/1989 | Kooiker | 296/100.09 |
| 4,848,830 | A | * | 7/1989 | Parson | 296/165 |
| 4,861,092 | A | * | 8/1989 | Bogard | 296/100.09 |
| 4,946,217 | A | * | 8/1990 | Steffens et al. | 296/100.09 |
| 5,011,214 | A | * | 4/1991 | Friesen et al. | 296/100.09 |
| 5,087,093 | A | * | 2/1992 | Repetti | 296/100.09 |
| 5,094,499 | A | * | 3/1992 | Simone, Jr. | 296/100.1 |
| 5,340,188 | A | * | 8/1994 | Goble | 296/100.06 |
| 5,498,066 | A | * | 3/1996 | Cuthbertson et al. | 298/23 C |
| 5,632,522 | A | * | 5/1997 | Gaitan et al. | 296/100.06 |
| 5,931,521 | A | * | 8/1999 | Kooiker | 296/100.09 |
| 5,961,173 | A | * | 10/1999 | Repetti | 296/37.6 |
| 5,988,728 | A | * | 11/1999 | Lund et al. | 296/100.03 |
| 6,086,134 | A | * | 7/2000 | Cravens et al. | 296/100.06 |
| 6,109,681 | A | * | 8/2000 | Edwards et al. | 296/100.02 |
| 6,309,005 | B1 | * | 10/2001 | Priest et al. | 296/100.06 |
| 6,382,699 | B1 | * | 5/2002 | Hanson | 296/100.09 |
| 6,702,360 | B1 | * | 3/2004 | Santos et al. | 296/100.07 |
| 6,769,731 | B1 | * | 8/2004 | Myers et al. | 296/100.09 |
| 6,783,169 | B1 | * | 8/2004 | Marx et al. | 296/100.09 |
| 6,824,190 | B1 | * | 11/2004 | Rogers | 296/100.09 |
| 6,899,372 | B1 | * | 5/2005 | Keller | 296/100.09 |
| 2006/0043756 | A1 | * | 3/2006 | Neubrand | 296/100.09 |

\* cited by examiner

*Primary Examiner*—D. Glenn Dayoan
*Assistant Examiner*—Paul Chenevert
(74) *Attorney, Agent, or Firm*—Richard K Thomson

(57) ABSTRACT

Attachment hardware is provided to enable a folding bed cover for a pickup truck to be stored on the bed in a substantially vertical position giving access to substantially the entire bed. This hardware includes a latch to secure the lower end against sliding while any of 3 different devices are employed to lock the top of the vertically positioned cover in place. Several embodiments of devices are taught herein, including manual, mechanically-assisted and fully automated devices, for collapsing and lifting the cover into its substantially vertical storage position.

17 Claims, 22 Drawing Sheets

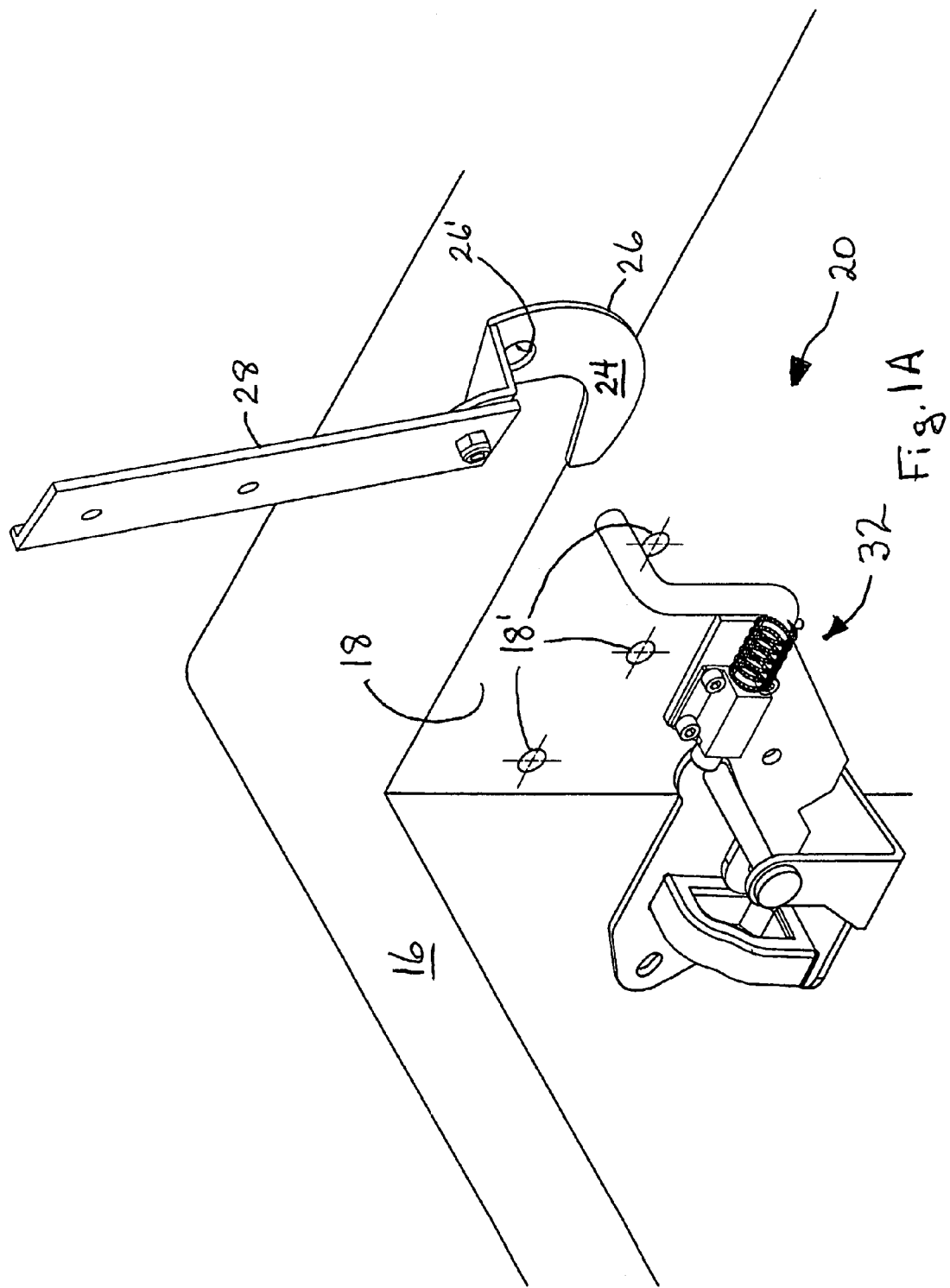

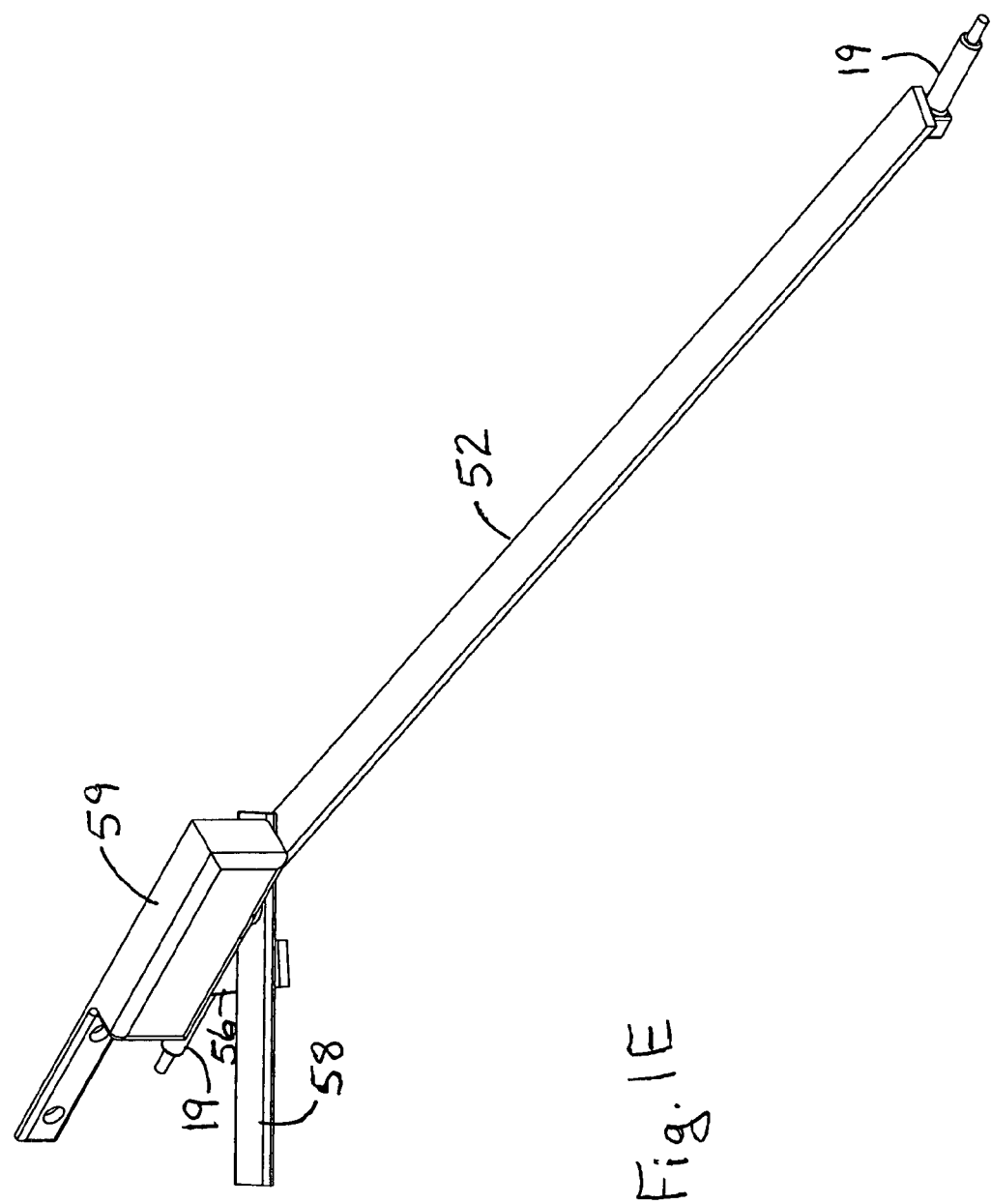
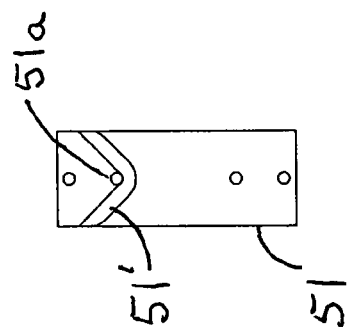
Fig. 1E

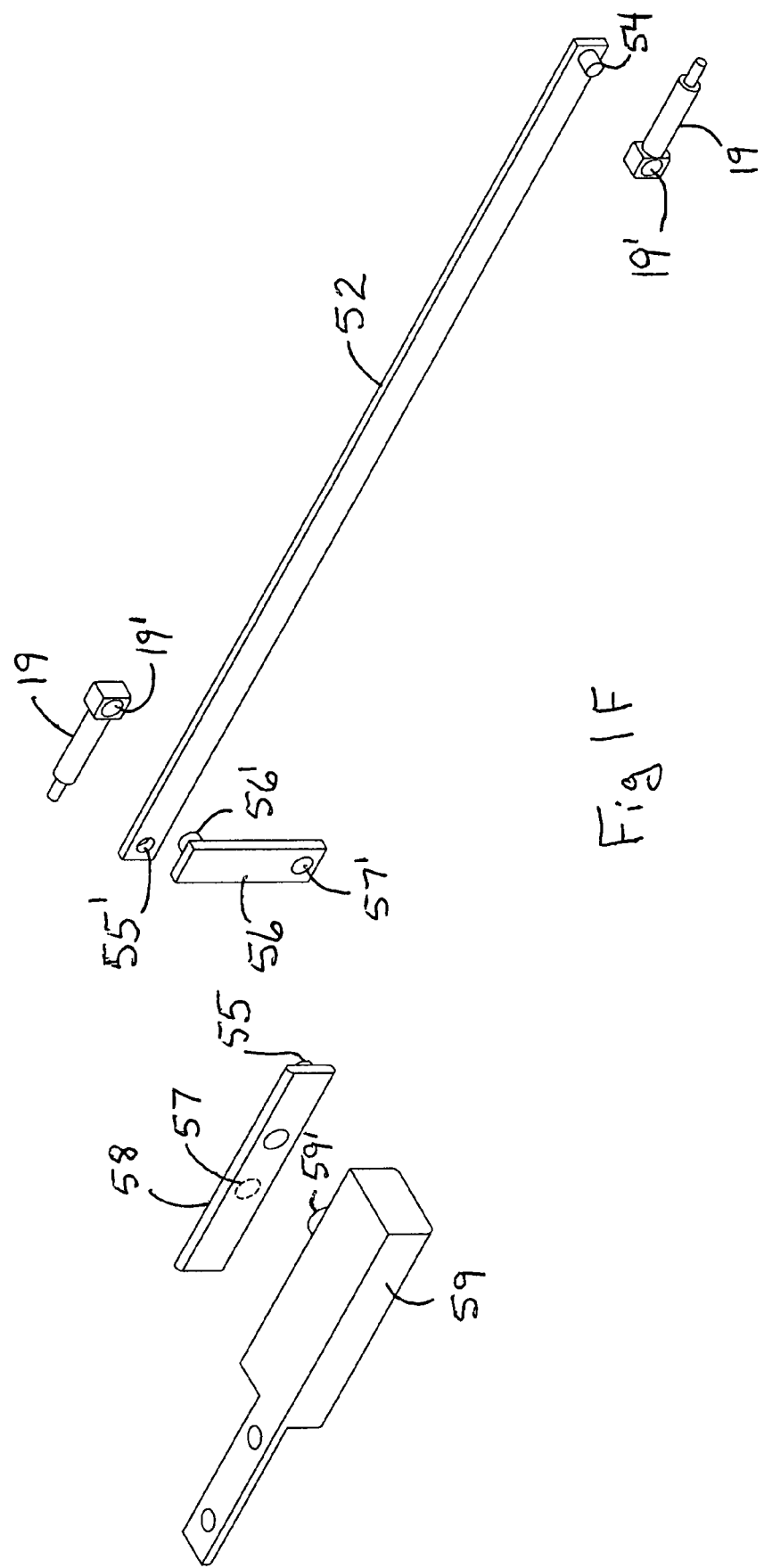

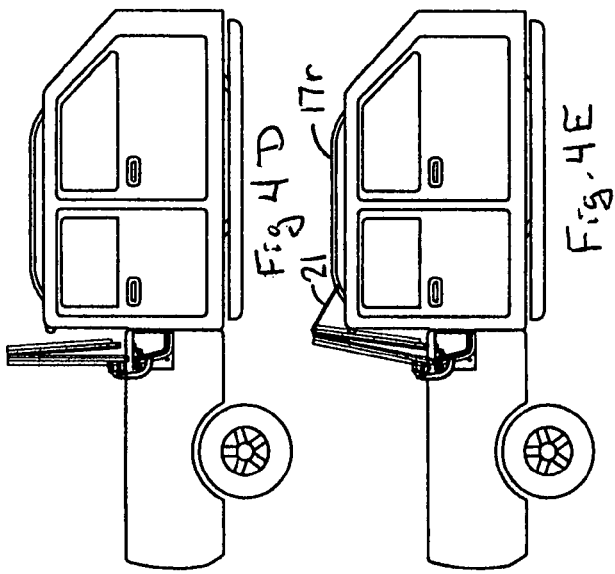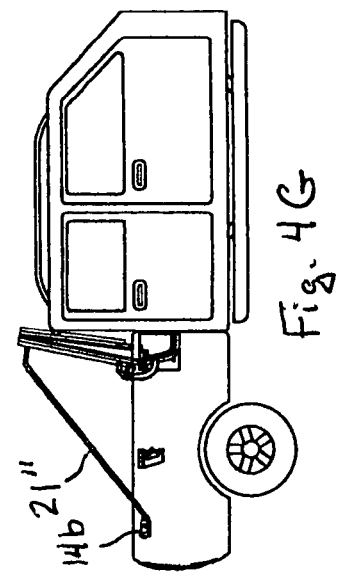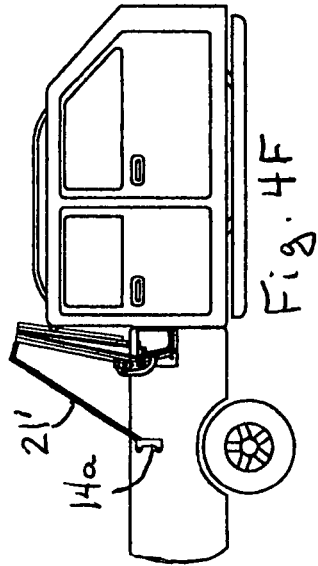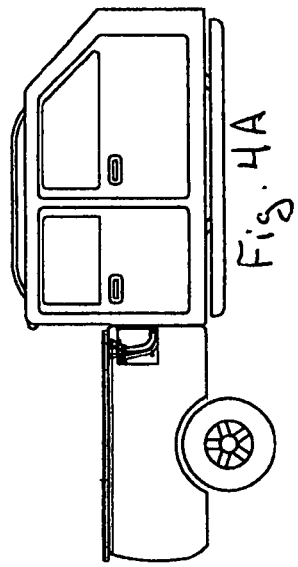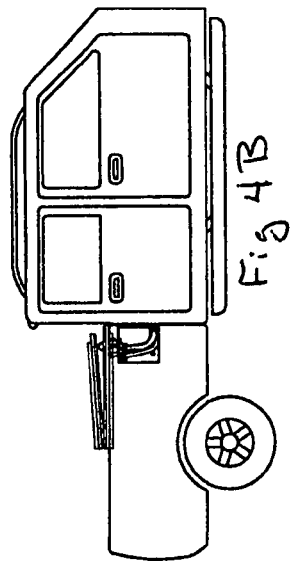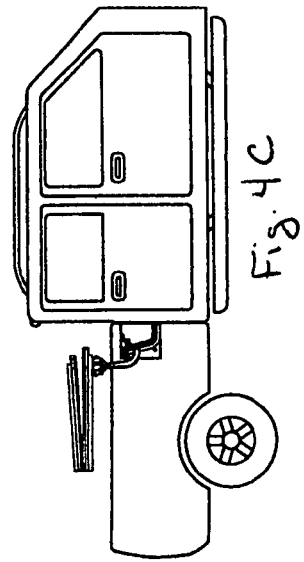

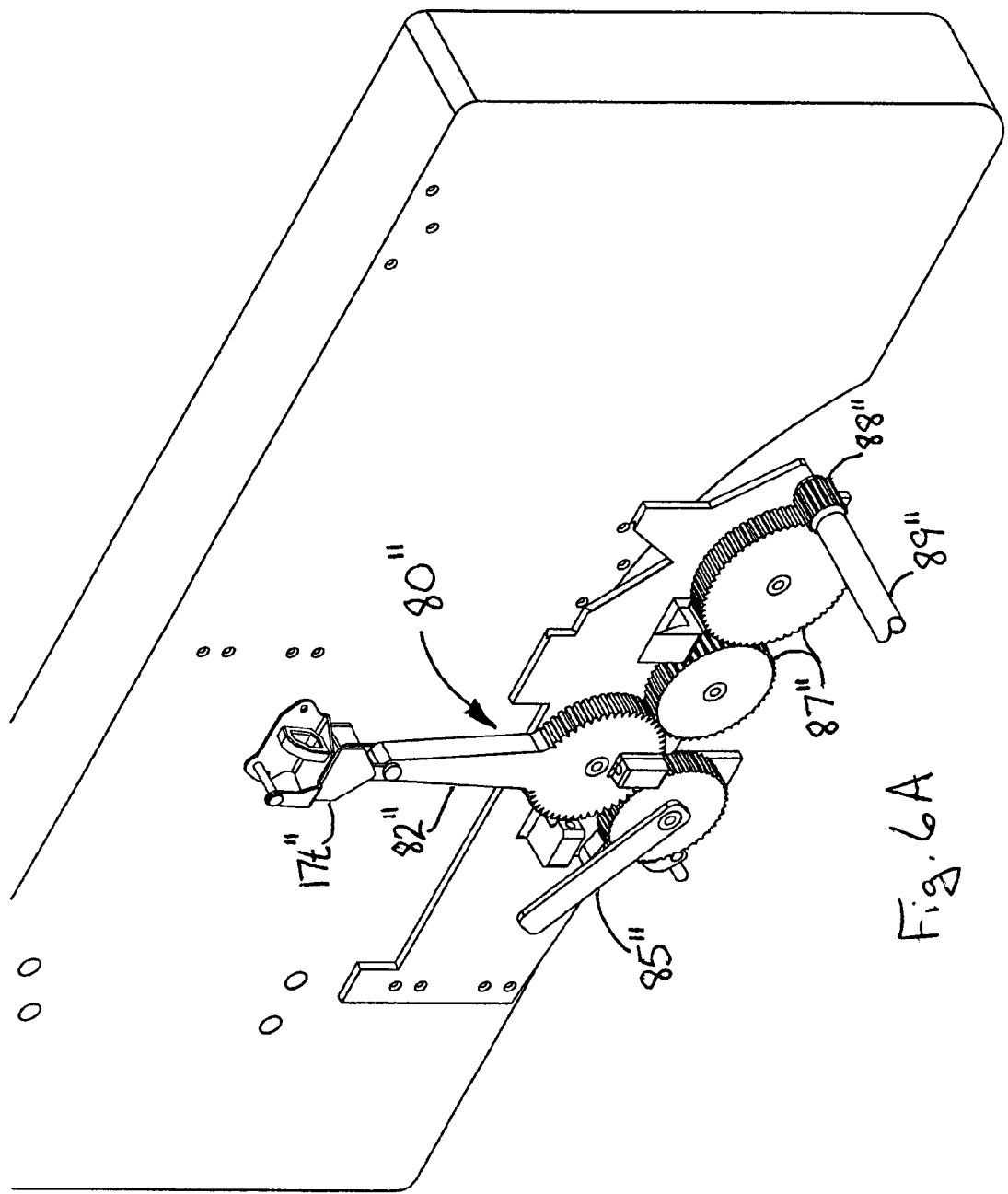

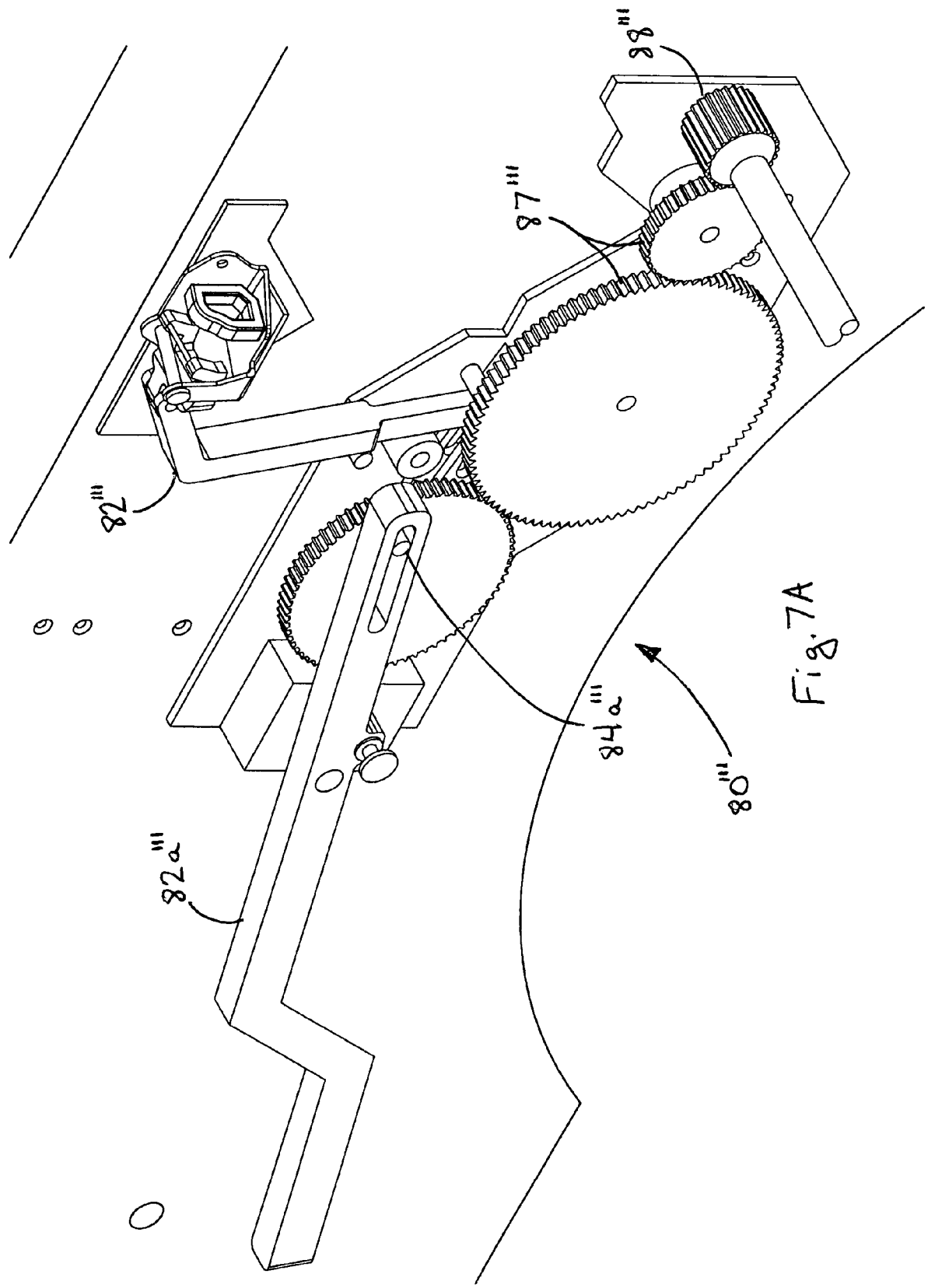

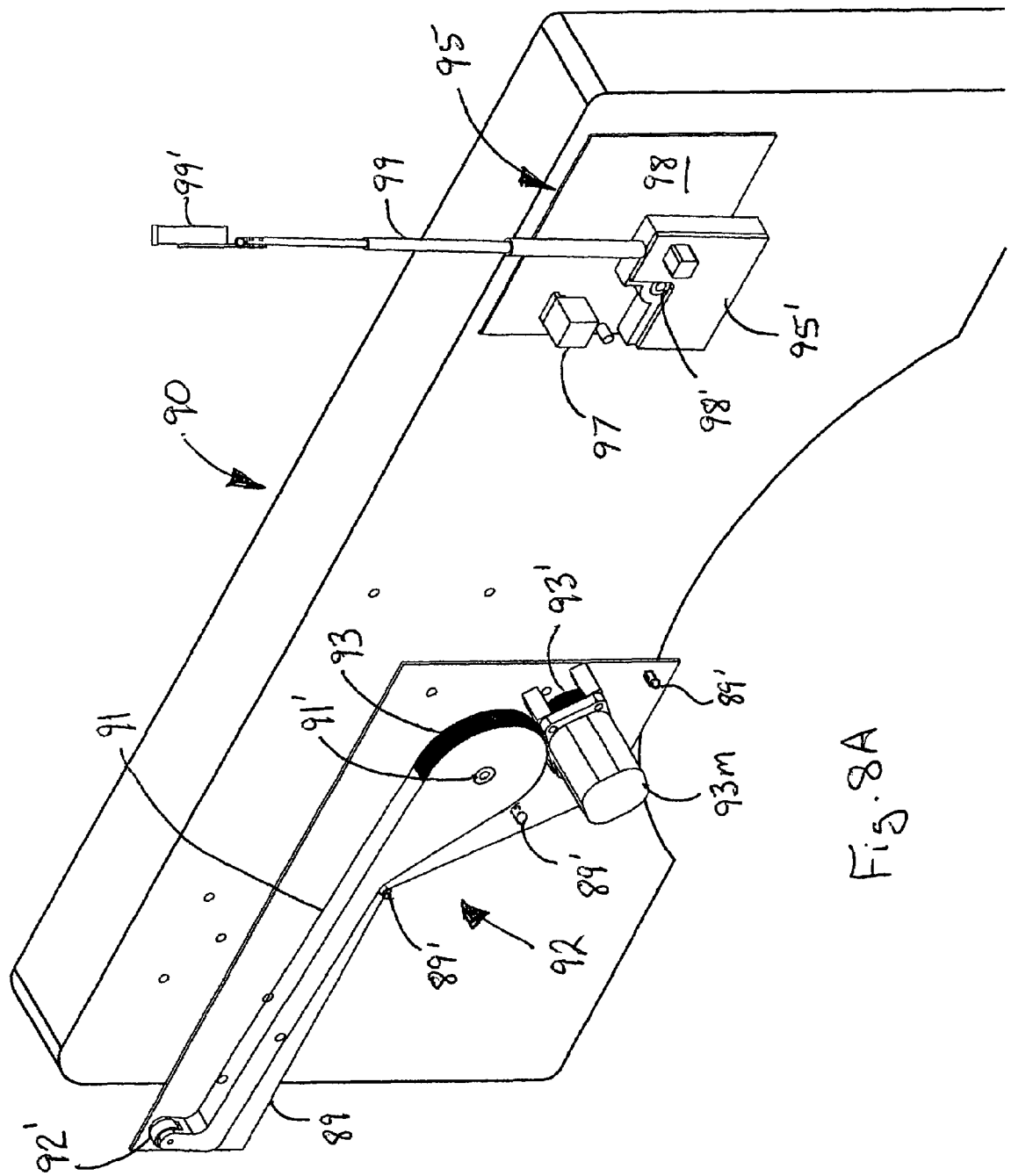

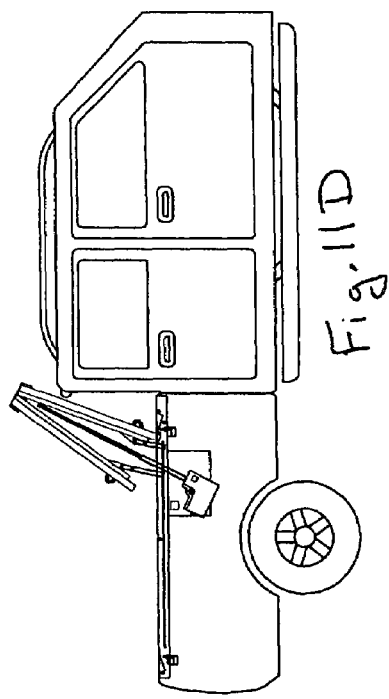
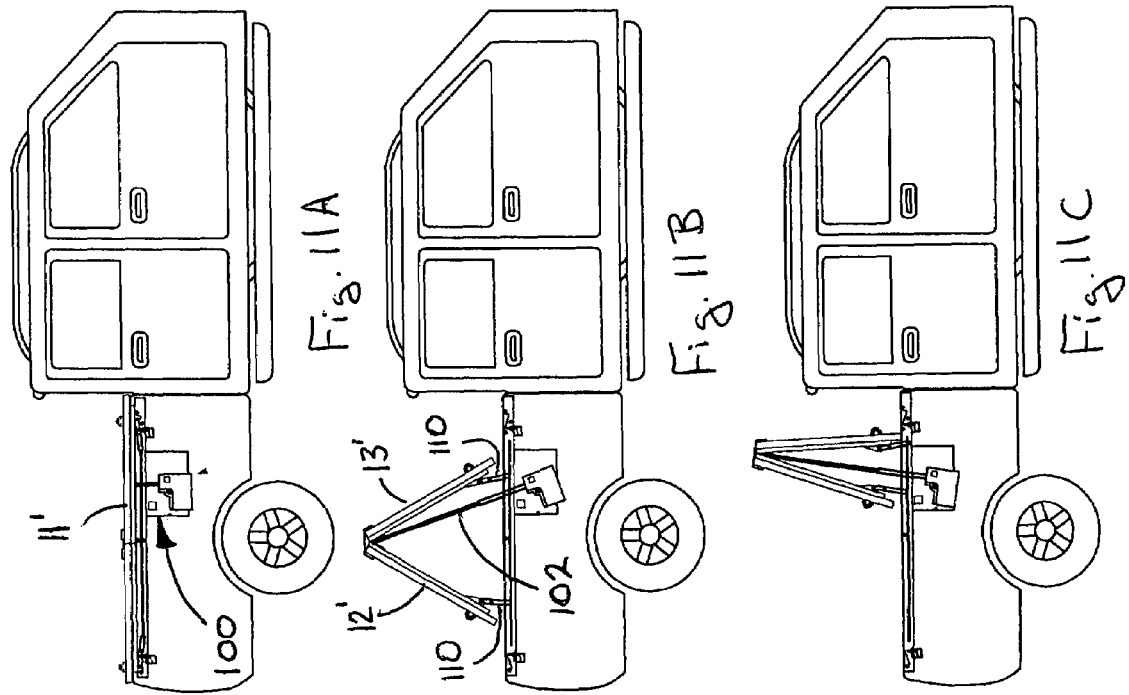

US 7,320,494 B1

HARDWARE TO FACILITATE STORING PICKUP BED COVER

BACKGROUND AND SUMMARY OF THE INVENTION

This application claims benefit of priority from provisional patent application No. 60/576,391 filed Jun. 3, 2004. The present invention is directed to the field of pickup truck accessories. More particularly, the present invention is directed to hardware to facilitate storing a pickup truck bed cover in such a fashion as to provide access to substantially the entire bed.

A number of attempts have been made to provide storage for a cover for a pickup truck bed. One of the difficulties of the existing foldable hard covers is that when stored on the truck bed, a significant portion of the bed remains unaccessible. In addition, most of these devices lack an adequate means of latching them in place when they are stored on the truck bed. A further limitation of these covers is that they do not provide any means to facilitate their collapsing to the stored position. The owner must strong-arm them from the covering position to the stored position.

The pickup truck bed cover hardware of the present invention for a cover having a plurality of sections of substantially equal size which cooperate to provide coverage of an entire area of a pickup truck bed, the hardware comprising latch means to secure a front edge portion of the pickup truck bed cover in a first position over a front portion of the pickup truck bed; means facilitating rotation of the pickup truck bed cover to a substantially vertical position; securing means holding the bed cover in the substantially vertical position; whereby the pickup truck bed cover can be stored in the substantially vertical position to provide unimpeded access to substantially the entire area of the pickup truck bed.

The means for facilitating rotation comprises means to elevate a forward end of the bed cover in its folded position to permit rotation thereof to the substantially vertical position. In one embodiment, the means to elevate includes a slide connected to the bed cover and a guide connected to an inner side wall of the pickup truck bed. The slide can take the form of a cylindrical member with a wheel at one end, the cylindrical member being pivotable about the guide and a motor to effect the pivoting. In a second embodiment, the means to elevate comprises gear means including a plurality of interengaged gear elements to lift and rotate the bed cover in its folded position to its substantially vertical position. In one variation, the gear means includes a manually operable ratchet means to rotate the interengaged gear elements thereby elevating the bed cover to its substantially vertical position.

In a further variation, the gear means includes a manually operable lever device to rotate said interengaged gear elements thereby elevating the bed cover to its substantially vertical position. In still a third variation, the elements include a first gear engaging a toothed outer periphery of a semi-circular surface of a pivot arm and a motor driving the first gear in a first rotational direction to rotate the semi-circular surface in an opposite rotational direction to rotate the pivot arm and a first of the plurality of sections onto a second of the plurality of sections. Cable means is attached to a first end of the first of a plurality of sections and brake means to retard movement of the first of the plurality of sections as it is folded onto the second of the plurality of sections is provided. The brake means includes a resistance clutch and a rewind motor connected to the cable. A telescoping push rod engages a recess in a nether surface of the second of the plurality of sections to rotate the folded bed cover to its substantially vertical position.

The securing means may comprise means to attach an upper portion of the bed cover in its substantially vertical position to a portion of the truck's roof. Alternatively, the securing means may comprise means to fix the position of an upper portion of the bed cover by a tie rod attached to a portion of said truck bed. That portion may alternatively, be a central portion of a sidewall of the truck bed or a portion of the sidewall adjacent the tailgate of the truck bed.

The hardware latch means comprises first pivoting hook means attachable to each side of the truck bed cover and bracket means attached to right and left portions of the forward sidewalls of the truck bed. Each bracket includes spring-biased locking bolt means pivotally attached thereto engageable with the pivoting hook means to secure the bed cover in the first position over the portion of the truck bed. This auxiliary latch prevents kick out of the bottom of the bed cover as it stands in its substantially vertical position. Lastly, the hardware includes a latching bar extending substantially along a hinge means between the plurality of cover sections to lock the hinge means against pivoting.

Various other features, advantages and characteristics of the present invention will become apparent to one of ordinary skill in the art after a reading of the following specification.

BRIEF DESCRIPTION OF THE DRAWINGS

The preferred embodiment(s) of the present invention is/are described in conjunction with the associated drawings in which like features are indicated with like reference numerals and in which FIG. 1A is a perspective schematic view of a latch means of first embodiment of the hardware of the present invention for facilitating storing a bed cover;

FIG. 1E is an perspective top view of the release mechanism of FIG. 1D;

FIG. 1F is an exploded perspective view of the release mechanism;

FIGS. 4A-4G are a schematic depiction of the steps to place the bed cover equipped with the second embodiment of hardware in its stored position;

FIG. 6A is a partially exploded perspective view of a fourth hardware embodiment including a second embodiment of a mechanically enhanced means to elevate the cover;

FIG. 7A is a partially exploded perspective view of a fifth hardware embodiment including a third mechanically enhanced means to elevate the cover;

FIG. 8A is a partially exploded view of a sixth embodiment, the first with a fully automatic system for storing the truck bed cover;

DETAILED DESCRIPTION OF PREFERRED EMBODIMENT(S)

Figure 1B:
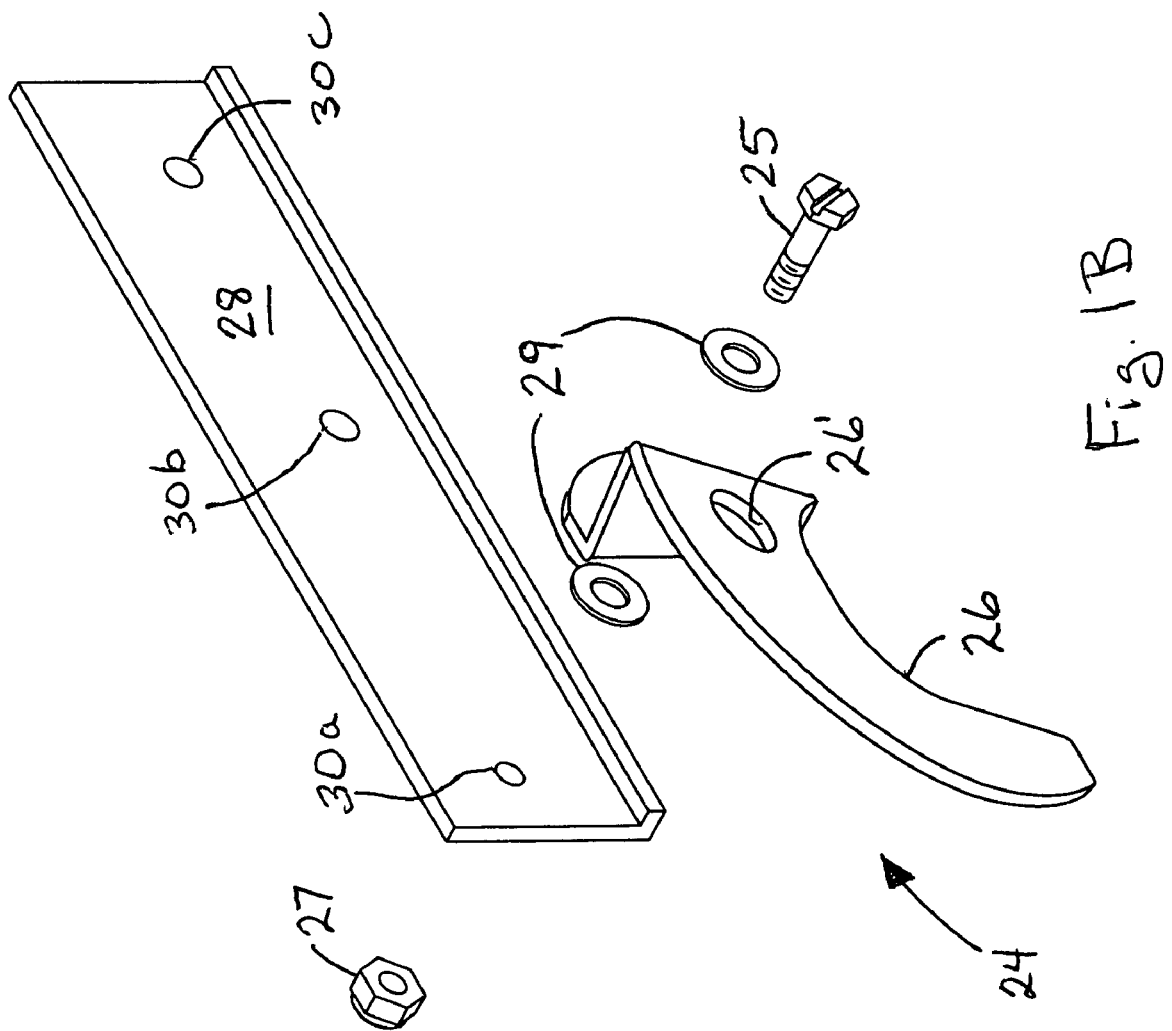
FIG. 1B is an exploded perspective view of one portion of the latch means.

A latch means forming part of the first embodiment of the cover hardware of the present invention is depicted in FIG. 1A generally at 20. A conventional hard cover 11 has a plurality of sections, including a first section 12 and a second section 13 (FIG. 1D). Latch means 20 includes pivoting hook means 24 attached to each side 13' of second section 13 near the front edge 15 thereof (FIG. 1D). When pivoting hook means 24 is rotated to a forward position extending out past front edge 15, it will sit atop the forward end 16 of truck bed 14.

As seen in FIG. 1B, hook means 24 includes hook 26 which has a hole 26' therein and a plate 28 with a plurality of holes 30a, 30b, 30c. Fastening hardware including bolt 25 and nut 27 along with washers 29 are used to rotatably secure hook 26 to forward most hole 30a of plate 28. The remaining holes 30b, 30c are used to secure plate 28 with hook 26 to the sides 13' of second section 13 of bed cover 11. As depicted schematically in FIG. 1A, plate 28 is positioned at the angle it would be when the cover 11 is in its substantially vertical position (FIG. 2G).

Figure 1C:
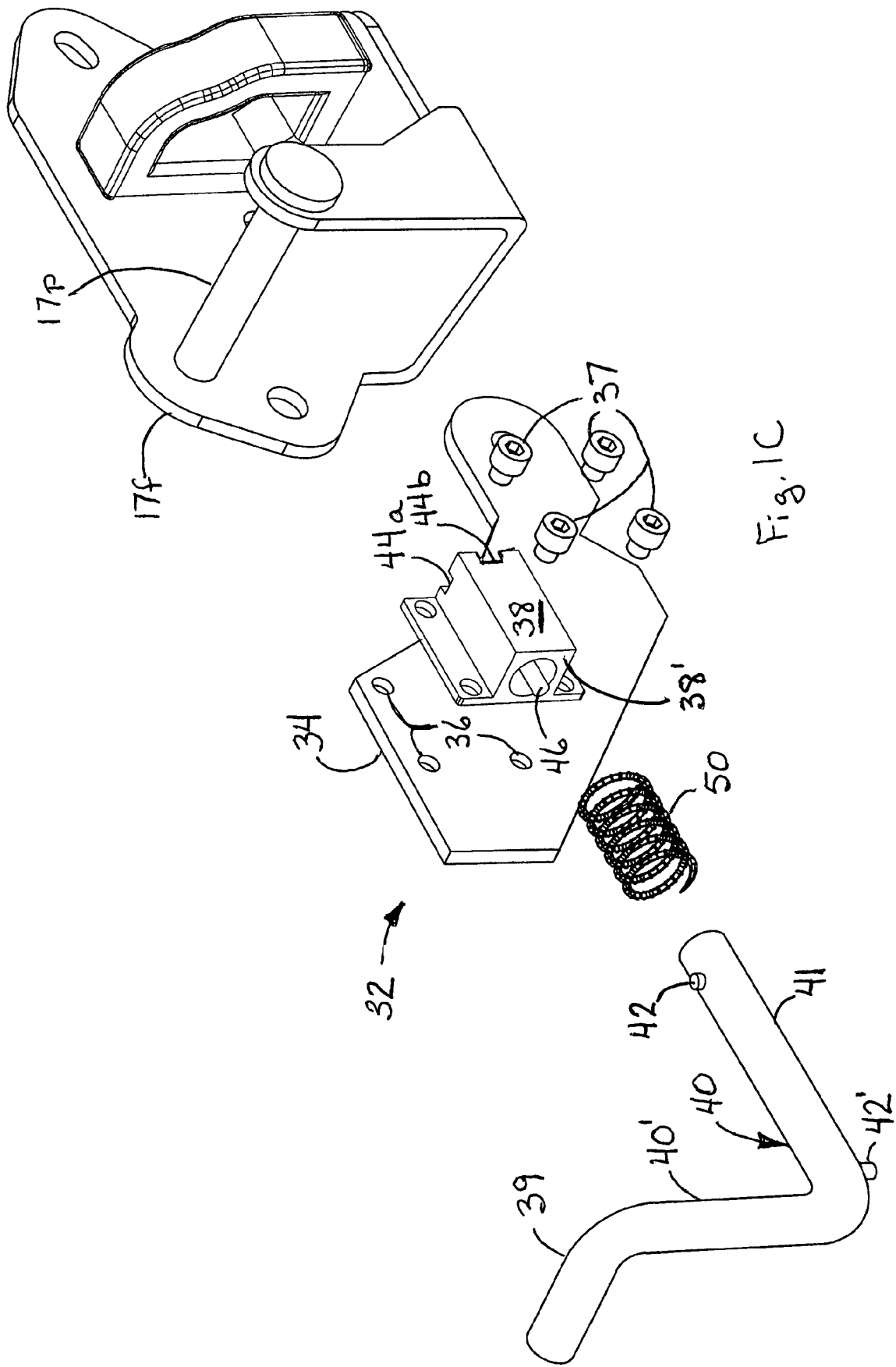
FIG. 1C is a exploded perspective view of a second portion of the latch means.
Figure 1D:
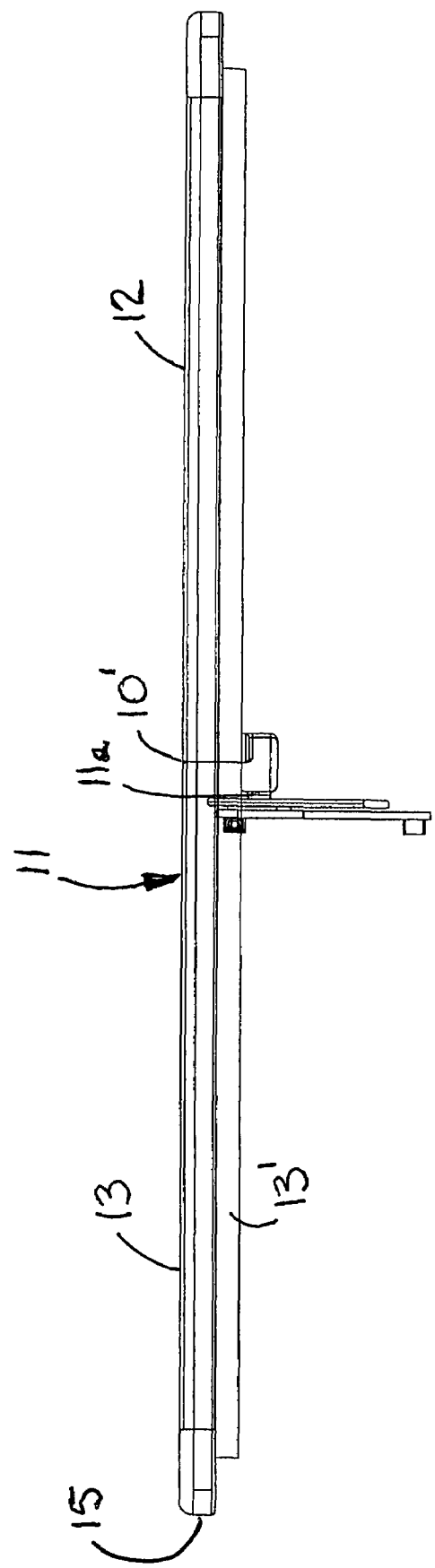
FIG. 1D is a side view of a center release mechanism used with the latch means.

The other portion of latch means 20 is a bracket 32. The bed cover 11 is typically attached to a bracket 17f (FIG. 1C) bolted to sidewall 18 using holes 18' (FIG. 1A). Bracket 17f is removed from its attachment to sidewall 18 and bracket 32 is attached thereto, then bracket 17f is reinstalled using the original bolts. As seen in FIG. 1C, bracket 32 includes plate 34, with threaded apertures 36 which receive cap screws 37 to secure box 38 thereto. Locking bolt 40 is generally Z-shaped with one of the legs 39 of the Z twisted 90° out of plane from the other leg 41. Leg 41 has a pair of button stops 42, 42' formed on an upper and lower surface, respectively. Spring 50 acts between vertical surface 38' of box 38 and vertical arm 40' of locking bolt 40, serving to keep button stop 42 engaged, selectively, in positioning notch 44a, 44b, or a third notch (not shown) on the lower surface opposite notch 44a. Slot 46 in box 38 permits locking bolt 40 to be inverted, button stop 42 to be aligned therewith, and spring 50 compressed until button stop 42 emerges from the opposite side of box 38. Once locking bolt 40 is reoriented to its upright position, and bracket 32 attached to bracket 17f, the face of bracket 17f will prevent locking bolt 40 from being turned to the point where button stop 42 will align with slot 46, ensuring that bracket 32 remains in an assembled condition.

Conventional bed cover 11 has a capture latch (not shown) of the type used in automobile door, hood and trunk applications, that captures latch pin 17p (FIG. 1C). The capture latch is key operated in the top of the bed cover 11 to permit removal of bed cover 11 from truck bed 14. Typical key-operated latches open both sides simultaneously. A conventional bed cover 11 has central locking pins 19 which are positioned beneath the center hinge 10' (FIGS. 1D and 1E) to lock the bed cover 11 in an extended position. To implement the present invention, it is necessary to make unlatching locking pins 19 more expedient. The elements shown in FIG. 1F are rolled on their sides from their installed positions to reveal information which would otherwise be masked. Locking pins 19 (FIG. 1F) have bores 19' formed therein. Retraction bar 52 has a pin 54 which engages in bore 19' and a hole 55' in its opposite end which receives a pin 55 on release handle 58. Similarly, linkage member 56 has a pin 56' that is received in bore 19' in the near side locking pin. The opposite end of linkage member 56 has a hole 57' that receives pin 57 from release handle 58. Pivot block 59 is bolted to the side of a downwardly extending face 11a of bed cover 11. Release handle 58 rotates about pin 59' extending from the bottom of pivot block 59. When handle 58 is rotated toward the viewer (FIG. 1E), retraction bar 52 pulls locking pin 19 out of locking engagement on the far side while linkage 56 pulls pin 19 out of locking engagement on the near side. While handle 58 is designed to be manually operated, it will be understood that this operation could be mechanized without departing from the scope of the invention. Since the connections of locking pins 19 to retraction bar 52 and linkage 56 are loose, a guide plate 51 having a V-shaped trough 51' is positioned with a through hole 51a to catch the ends of pins 19 and guide them into latching position.

Figure 2B:
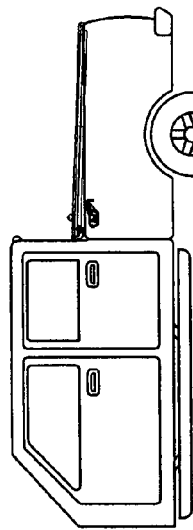
FIGS. 2A-2G are schematic depictions of the steps to place the bed cover equipped with the first embodiment of hardware in its substantially vertical stored position.
Figure 2D:
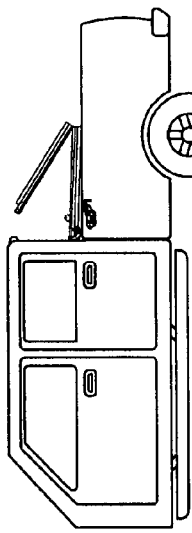
Figure 2F:
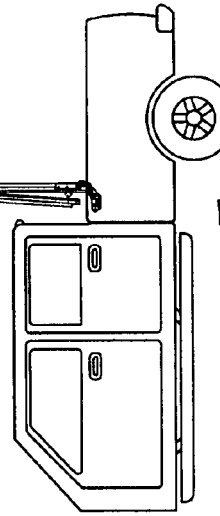
Figure 2A:
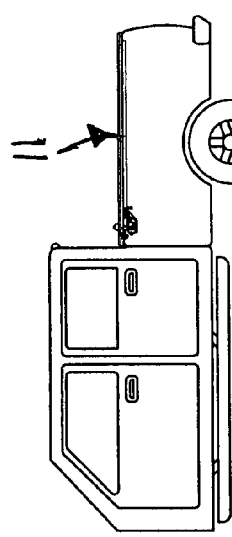
Figure 2C:
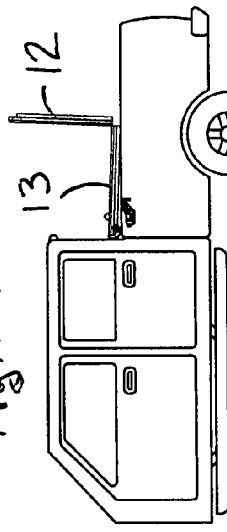
Figure 2E:
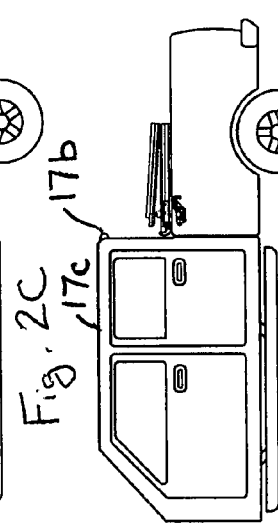
Figure 2G:
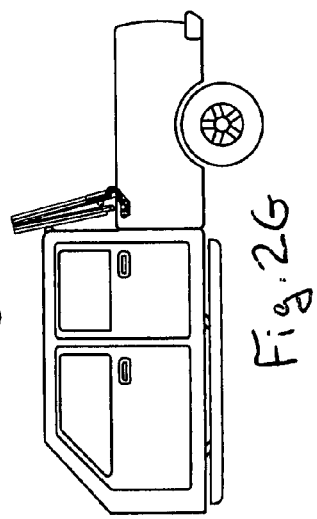

In implementing the features of the first embodiment, reference is had to FIGS. 2A-2G. The front (or second) section 13 is opened using the key which comes with the bed cover 11 to unlatch the cover latches and the pivoting hook means 24 moved from the stored position (FIG. 2A) to the forward position (FIG. 2B) where they overlie the front 16 of truck bed 14. The rear cover latches are then keyed open and the first cover section 12 raised (FIG. 2C) and then lowered toward (FIG. 2D) second cover section 13. When the first cover section 12 is lying on second cover section 13 (FIG. 2E), the center latch retraction bar 52 is actuated to unlatch locking pins 19. The bed cover 11 is free, sitting atop truck bed 14. The pivoting hook means 24 are extending above the forward end 16 of truck bed 14 just inside sidewalls 18. As the bed cover 11 is pivoted to its vertical position (FIG. 2F), hook means 24 serve to guide the edges 13' of the cover and maintain it in proper alignment with the bed 14. When bed cover 11 is in the substantially vertical position with hook means 24 situated within the bed 14, locking bolt 40 is rotated to the position where button stop 42 is positioned in notch 44a and the end of leg 39 in hole 26' in pivoting hook 26 to secure the lower end of bed cover 11 against movement. The bed cover is then leaned against the center light bar 17b on the roof 17c (FIG. 2E). If desired (or, in some states, as may be required) an auxiliary light (not shown) can be positioned along the top portion of bed cover 11 to augment the information conveyed by the tail lights. The top of bed cover 11 can be secured by any of the ways discussed regarding the second embodiment.

Figure 3A:
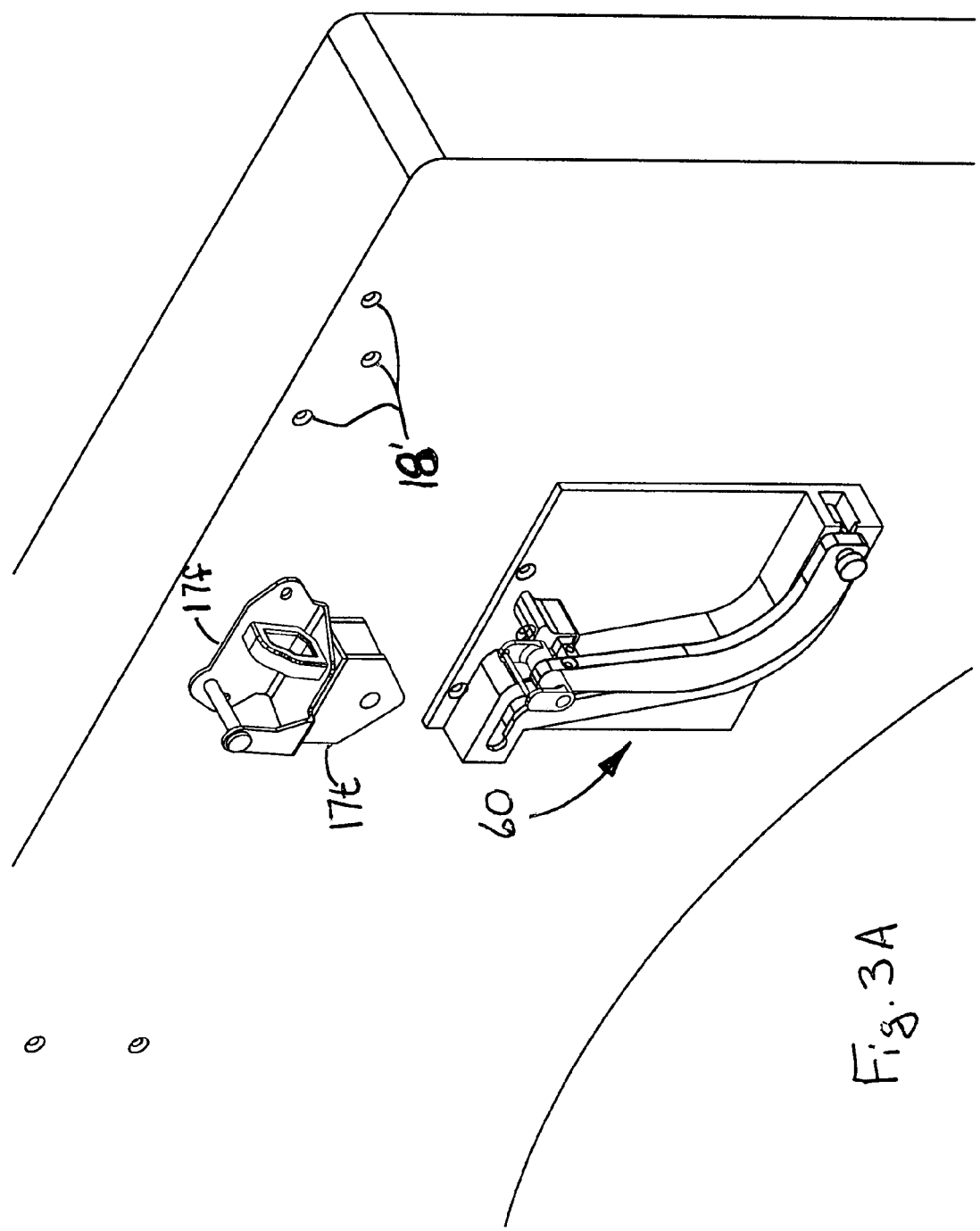
FIG. 3A is a perspective schematic view of a second embodiment of hardware with first means to elevate the bed cover.
Figure 3B:
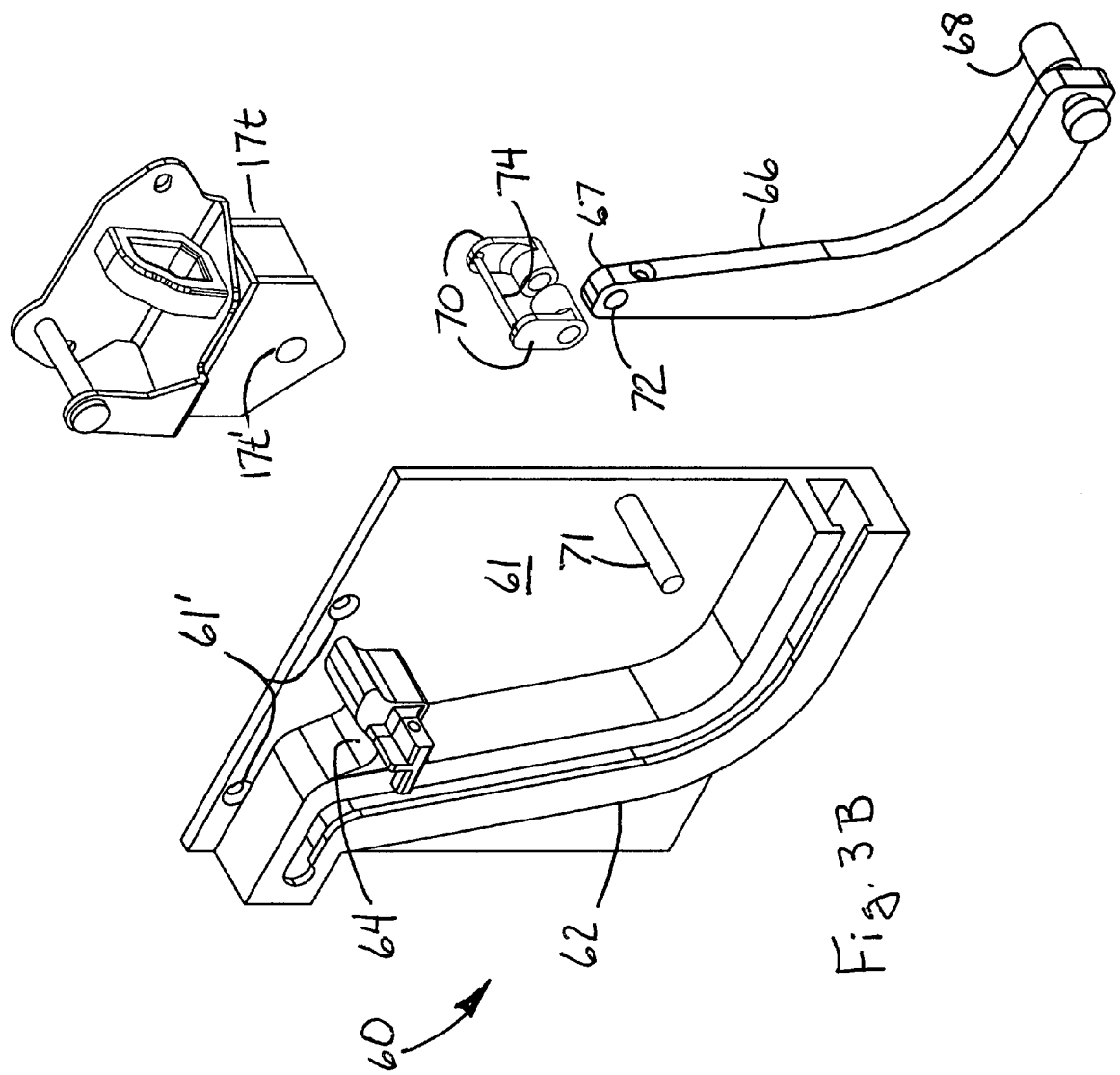
FIG. 3B is an exploded perspective view of the first means to elevate the bed cover.
Figure 5A:
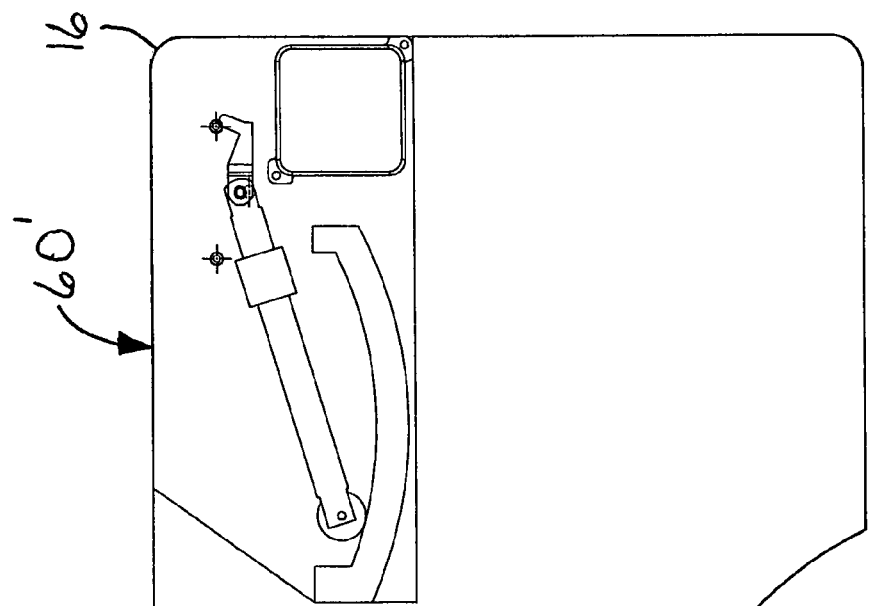
FIG. 5A is a schematic side view of a third embodiment of hardware including a second alternative means to elevate the bed cover including a mechanical assist.
Figure 5D:
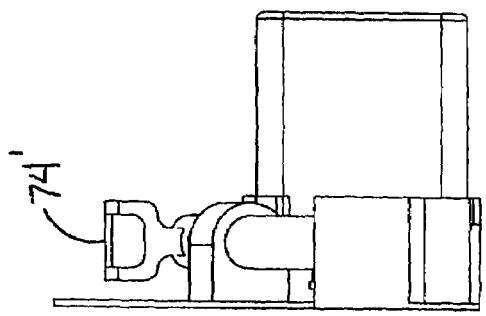
FIG. 5D is a front view of the second embodiment.
Figure 5B:
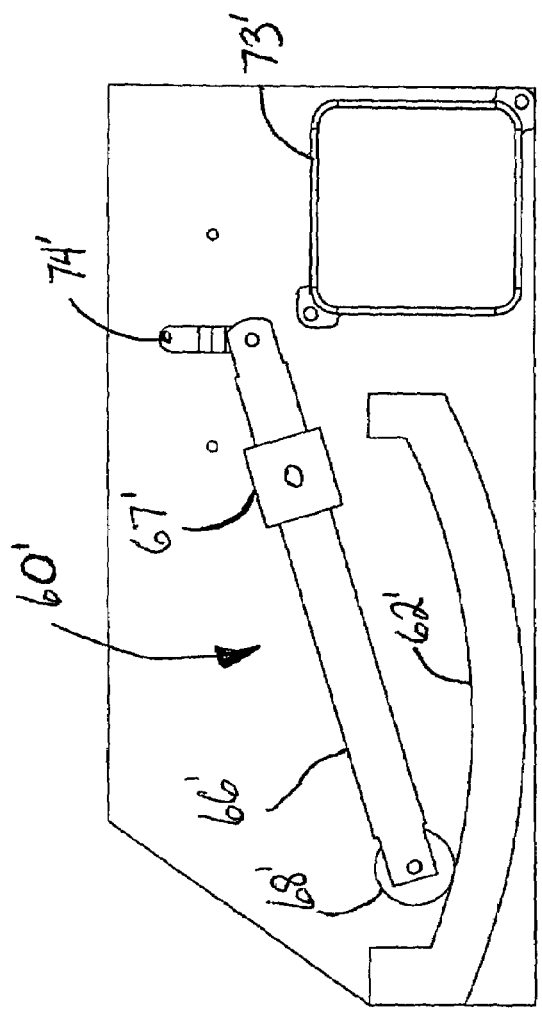
FIG. 5B is a detailed side view of the third embodiment shown in FIG. 5A.
Figure 5C:
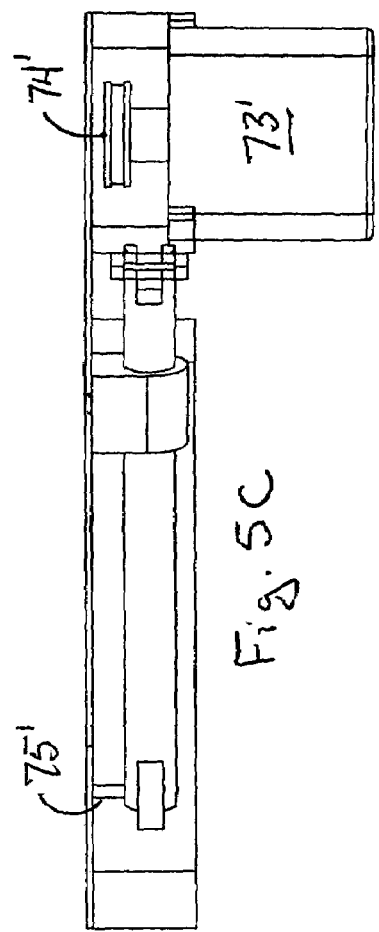
FIG. 5C is a top view of the third embodiment.

A second embodiment of the hardware of the present invention including first means to lift the bed cover 11 above the level of the bed 14 is shown in FIG. 3A generally at 60. As depicted in that partially exploded view, conventional bracket 17*f* is removed from bed 14 and the holes 18' therein are used to mount lift means 60. Truncated triangular member 17*t* is attached to the bottom of latch 17*f*, by bolts (not shown) or welding, for example. As best seen in FIG. 3B, lift means 60 includes guide track 62 on plate 61 which has a series of holes 61' whose pattern matches that of holes 18' in truck bed 14. The bolts used to attach bracket 17*f* may be used to attach guide track plate 61. A slide arm 66 with a guide roller 68 rides up and down guide track 62. A notch 64 formed in front of guide track 62 seats the truncated triangular member 17*t*.

As seen in FIG. 3B, upper end 67 of slide arm 66 has a pair of ears 70 affixed thereto by a pin 71 which passes through hole 72. A cross rod 74 will be captured in the hole 17*t'* in truncated triangular member 17*t*. The capture latch on bed cover 11 will engage latch pin 17*p* as it conventionally does. However, it is not necessary in this embodiment to release the latch with the key as a preliminary step to storing bed cover 11. The length of slide arm 66 exceeds the distance between the front edge 15 of cover 11 and the capture latch (i.e., the height to which cover 11 is raised exceeds the clearance needed for the cover 11 to pivot about front edge 15). As seen in the sequence depicted by FIGS. 4A-4E, once the first cover section 12 has been folded onto second section 13 (FIG. 4B) bed cover 11 can be lifted (FIG. 4C), as the rollers 68 of slide arm 66 travel up guide track 62 (FIG. 3A), and rotated into a substantially vertical position (FIG. 4D). Slide arm 66 serves the same purpose as latch means 20, that is, to anchor the lower end of bed cover 11 from migrating. The top end can be tilted to lean against the light bar 17*b*, as in the previous embodiment.

Bed cover 11 can be secured in its substantially vertical stored position using a bungee cord 21 to attach it to roof rack 17*r*, one on each side (FIG. 4E). Alternatively, securement rods 21' can be attached to the upper portion of bed cover 11 and a securement handle 14*a* near the center of bed 14 (FIG. 4F). As a second alternative, a longer securement rod 21" can be used to attach between the upper portion of the bed cover 11 and a second securement handle 14*b* near the rear of the truck bed 14 (FIG. 4G). It will be understood that two securement rods 21', 21" are used, one on each side.

A third embodiment of the hardware of the present invention depicting a second means to lift the bed cover 11 is depicted in FIGS. 5A-5D generally at 60'. In this embodiment, second lift means 60' comprises a pivoting cylindrical member 66' received in a pivoting guide bushing 67'. Roller 68' travels along guide track 62' and, as bushing 67' pivots, cross rod 74' is lifted and, as in the previous embodiment, lifts the truncated triangular member and the bed cover 11 to which it is attached. In this embodiment, motor 73' is provided to mechanize the movement. Motor 73' rotates pulley 74' to wind/unwind a cable (not shown) anchored to rod 75' to energize movement of cylindrical member 66'.

Figure 6B:
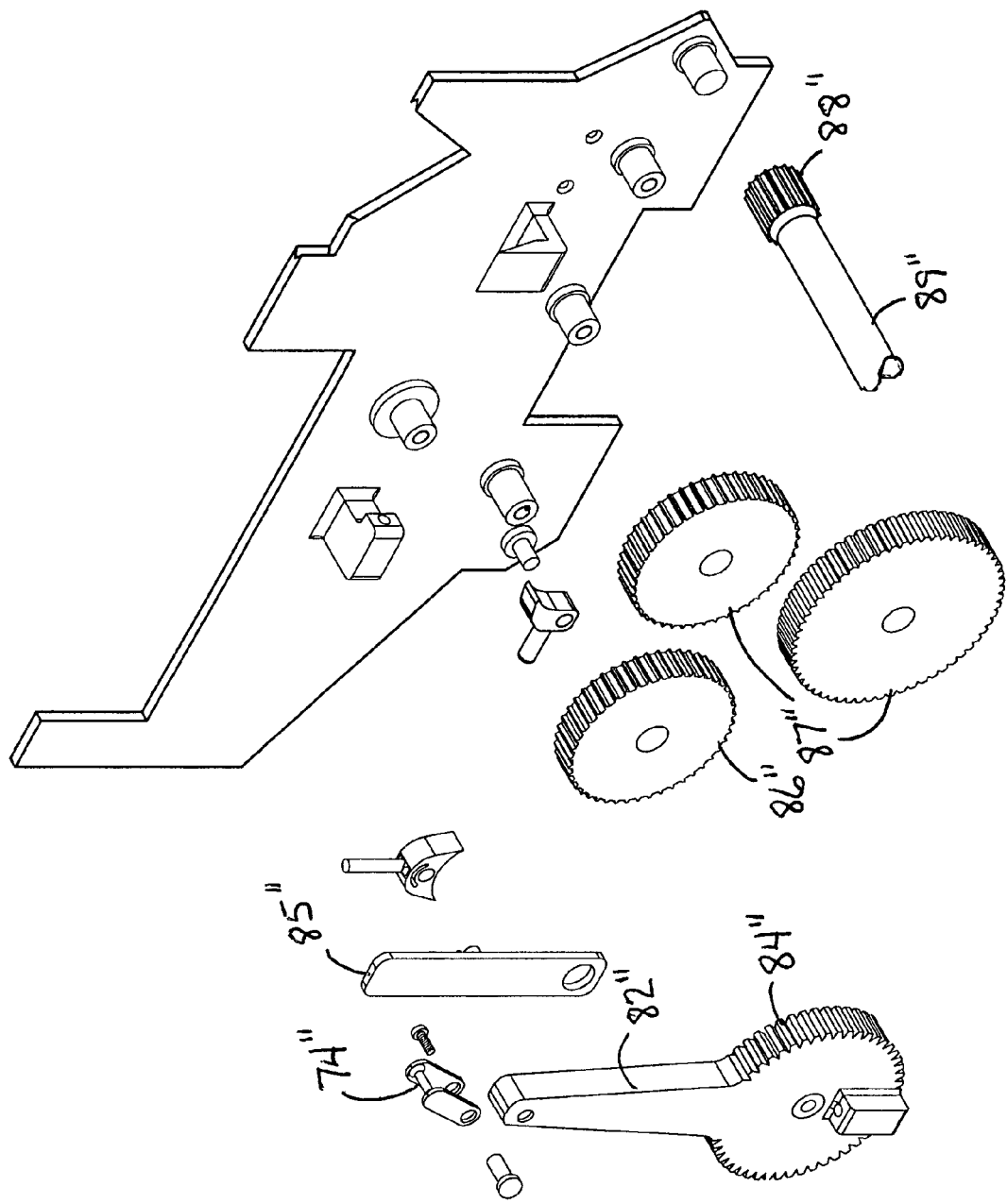
FIG. 6B is a fully exploded perspective view of the fourth embodiment including the mechanically enhanced means shown in FIG. 5A.

A fourth embodiment with a second mechanically-enhanced means to elevate the bed cover 11 is shown in FIGS. 6A and 6B generally at 80". In this embodiment, cross rod 74" is captured in truncated triangular member 17*t"* and sits atop lever arm 82". Lever arm 82" forms an extension of a first ratchet gear 84". Second ratchet gear 86" has a handle 85" permitting manual ratcheting to elevate the bed cover 11. It will be appreciated that a motor could be implemented to fully mechanize this mechanically-enhanced embodiment. Satellite gears 87" rotate transfer gear 88" which, by means of drive shaft 89", transfer rotation to a second lever arm (not shown) on the opposite side of truck bed 14.

Figure 7B:
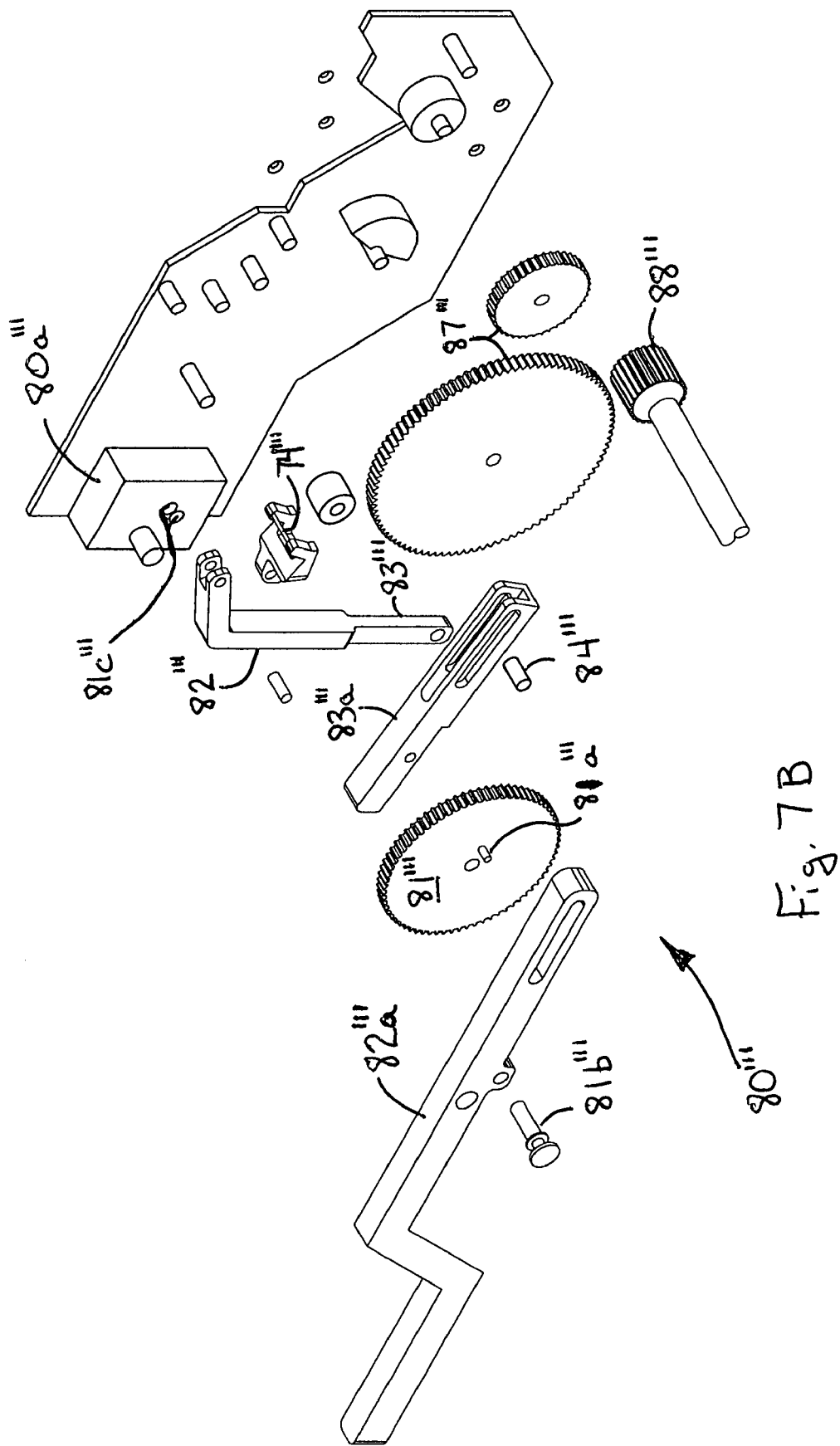
FIG. 7B is a fully exploded perspective view of the second embodiment of FIG. 7A.

A fifth hardware embodiment including a third mechanically-enhanced lifting means is shown in FIGS. 7A and 7B generally at 80'''. Cross rod 74''' sits atop a first crank arm 82''' and is moved up and down thereby. A pin 84''' links the end 83''' of first crank arm 82''' to an oscillating slide 83*a'''*. Oscillating slide 83*a'''* is coupled to rotate with drive gear 81'''. Pin 81*a'''* on drive gear 81''' is received in a slot in second crank arm 82*a'''*. Second crank arm 82*a'''* is pivotally mounted on pin 81*b'''* which is received in either of the holes 81*c'''* in mounting block 80*a'''*. Satellite gears 87''' and transfer gear 88''' function as in the previous embodiment to transfer rotational/translational movement to a mirror-image mechanism on the near side of the truck bed 14. By exerting downward force on the end of second crank arm 82*a'''*, drive gear and oscillating slide are forced to rotate in a counter-clockwise direction causing first crank arm 82''' to be lifted along with bed cover 11 attached thereto.

Figure 8B:
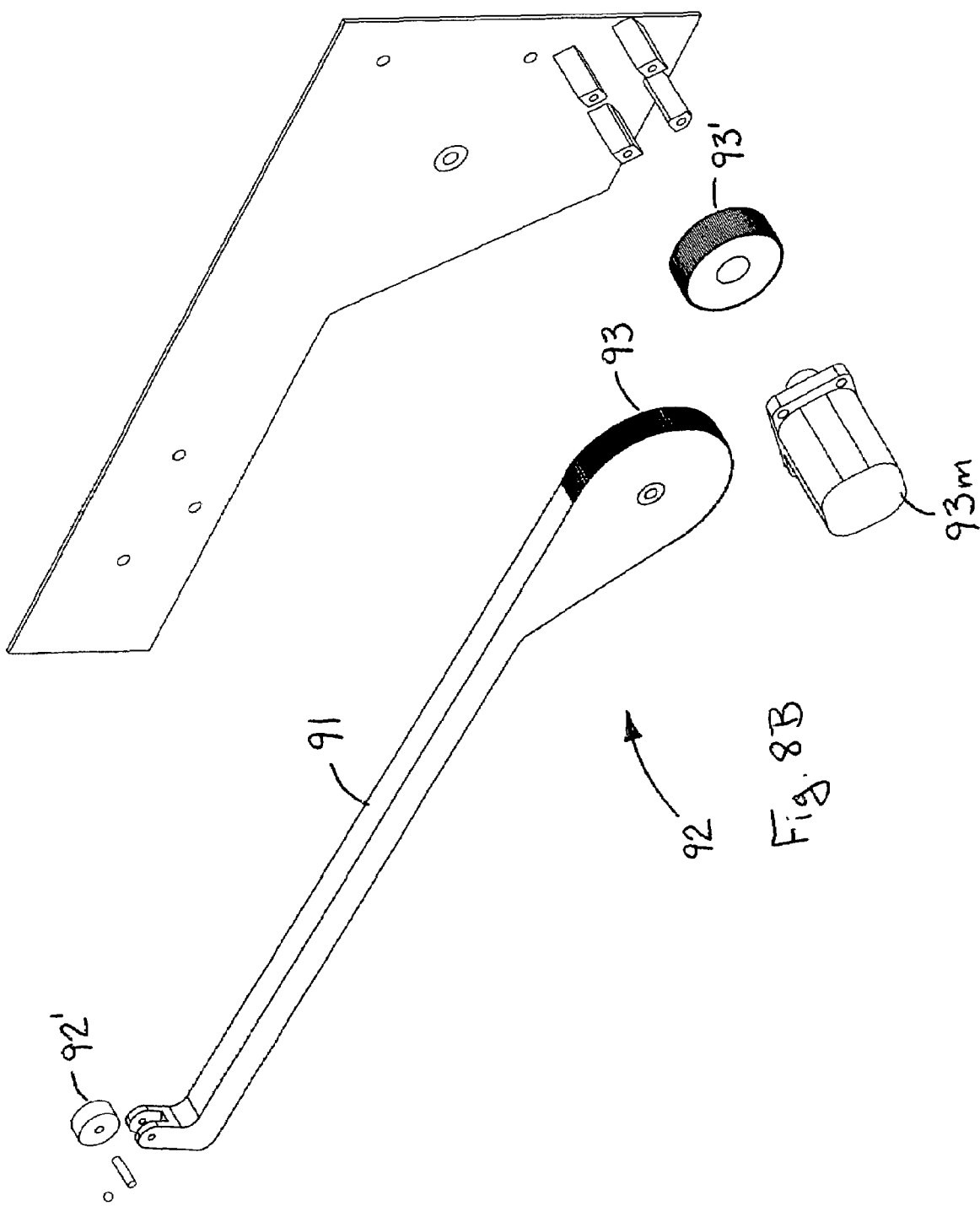
FIG. 8B is fully exploded perspective view of one of the driven elements of the FIG. 5A embodiment.
Figure 9A:
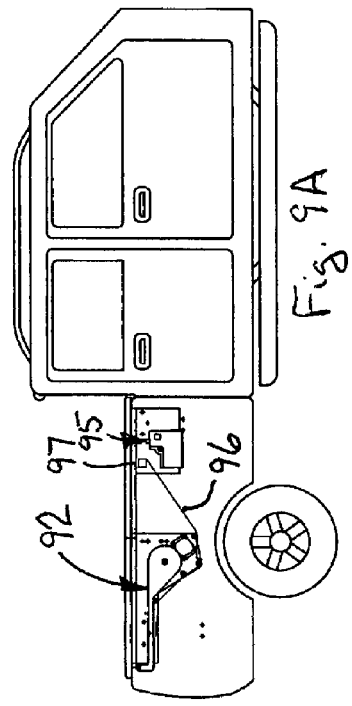
FIGS. 9A-9F schematically depict the operation of the first fully automatic embodiment.
Figure 9B:
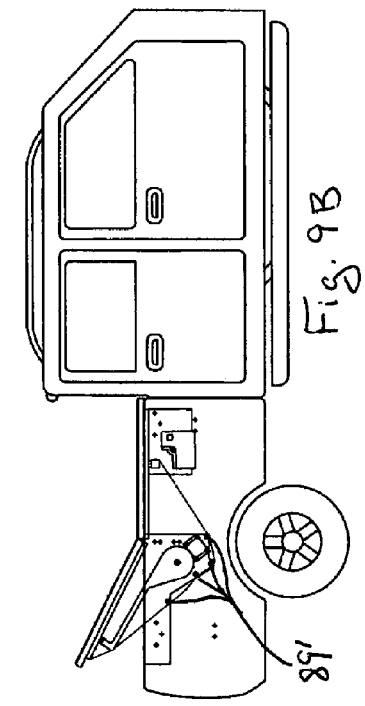
Figure 9C:
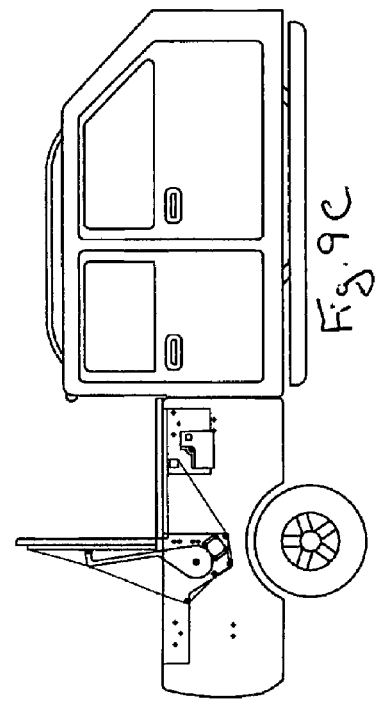
Figure 9D:
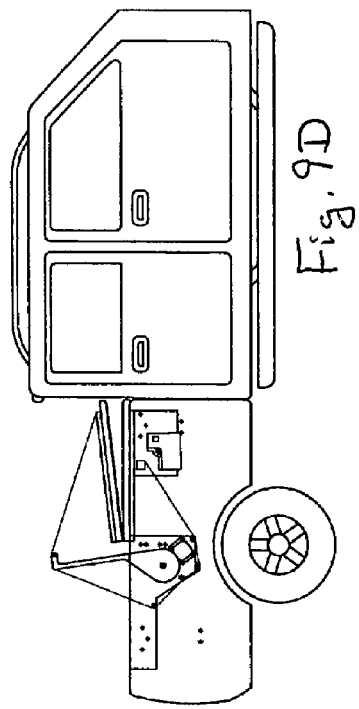

A sixth embodiment of the hardware of the present invention including a first fully automated lifting mechanism is shown in FIGS. 8A and 8B is shown generally at 90. Lifting mechanism 90 includes two elements: a rear lifter 92 for first section 12 and a forward lifter 95 for lifting/rotating the collapsed bed cover 11 (FIGS. 9A-9F). Rear lifter 92 includes pivot arm 91 with a semi-circular toothed periphery 93 which engages gear 93' which is powered by motor 93*m*. Pivot arm is mounted to rotate around bushing 91' secured to fixture plate 89. As seen in FIGS. 9B-9D, motor 93*m* rotates gear 93' which in turn, rotates toothed periphery 93 of pivot arm 91. As pivot arm 91 rotates, the roller 92' engages in the lower surface of first section 12 of bed cover 11 and folds it onto second section 13.

A retarding cable 96 is attached to the end of first section 12 to prevent it from banging down on second section 13. As seen in FIG. 8A, cable 96 emanates from braking means 97 mounted on forward lifter 95 and passing around guide pins 89' on fixture plate 89. However, it is contemplated that braking means 97 could be mounted on fixture plate 89. Braking means 97 includes a friction clutch and a retracting motor.

Figure 9E:
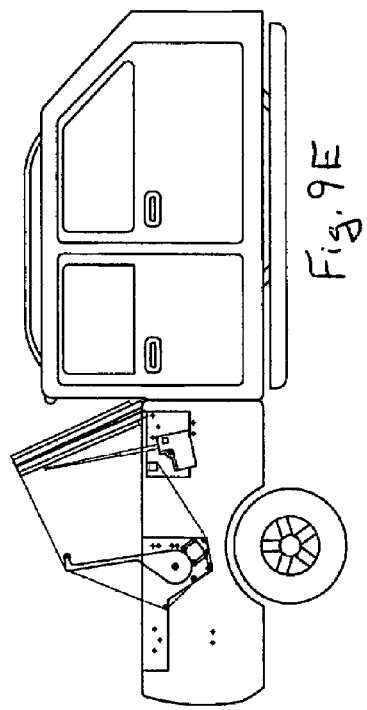
Figure 9F:
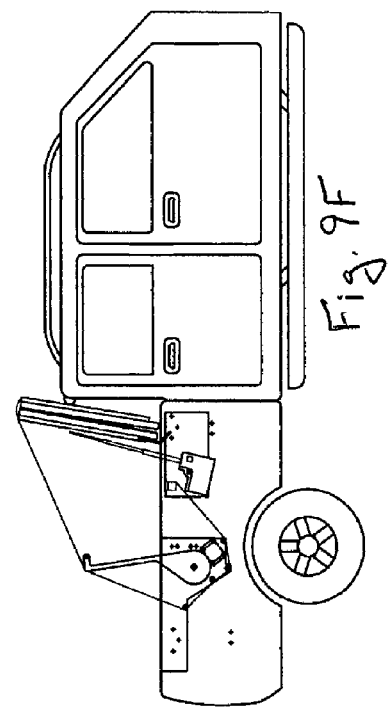

Forward lifter 95 comprises an electrically operated motor 95' which is rotationally mounted by bushing 98' on mounting plate 98. Extensible telescoping arm 99 has finger 99' mounted upon its distal end. Finger 99' engages in an opening in the underside of second section 13. As seen in FIGS. 9E and 9F, extensible arm 99 lifts and rotates the collapsed bed cover 11 to its substantially vertical storage position. While motor 95' will apply adequate force to maintain bed cover 11 in its stored position, any of the retention means described in connection with the earlier embodiments may be employed with this embodiment, as well.

Figure 10A:
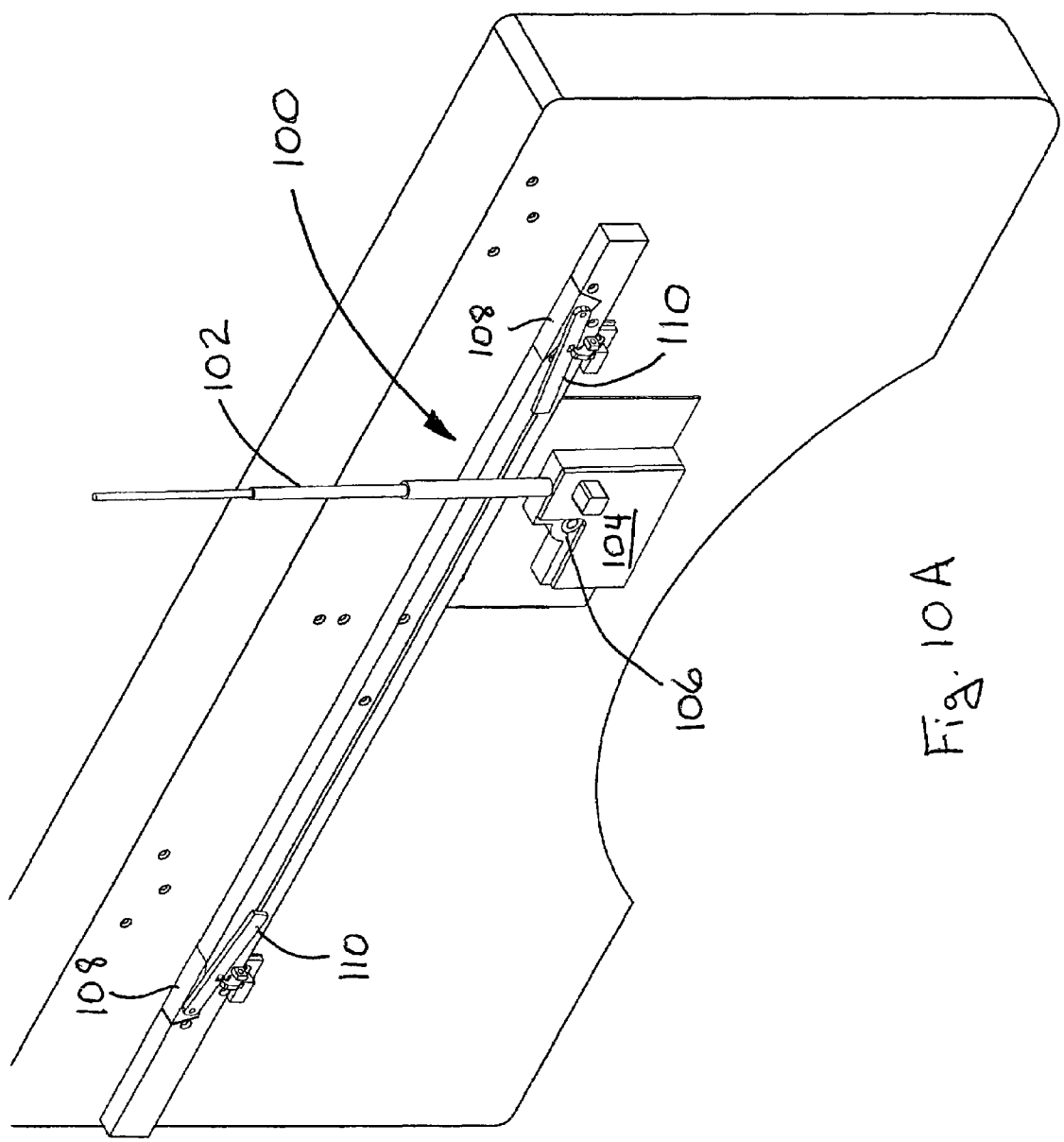
FIG. 10A is a partially exploded perspective view of a seventh hardware embodiment depicting a second fully automatic system for storing the bed cover.
Figure 10B:
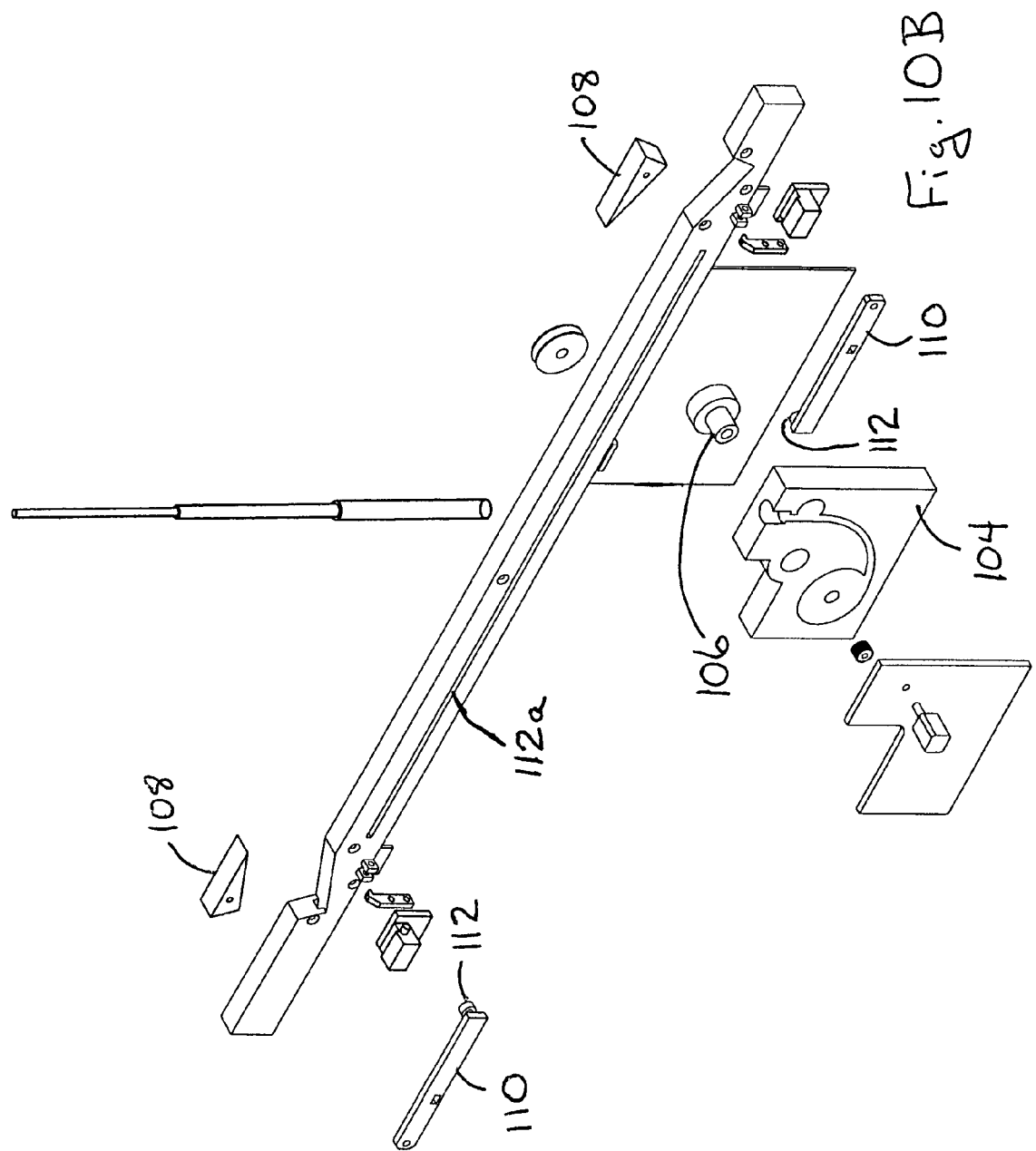
FIG. 10B is a fully exploded perspective view of the seventh embodiment shown in FIG. 10A; and, FIGS. 11A-11D schematically depict the sequence of operation of the second fully automatic embodiment.

FIGS. 10A and 10B depict a seventh embodiment which includes a second fully automatic folding means shown generally at 100. First section 12 is connected to second section 13 of bed cover 11' using a z-hinge which permits pivoting in both directions. This lifting means is similar to the forward lifter 95 of the previous embodiment but does not have structure corresponding to finger 99'. Extensible telescopic arm 102 is powered by an electric motor 104 which pivots about bushing 106. Lifting means 100 does double duty: it collapses bed cover 11', for which first and second sections 12' and 13' are hinged to pivot in the opposite direction, and lifts it into its substantially vertical storage position. As seen in FIG. 10A, triangular elements 108 correspond to truncated triangular members 17*t* of earlier embodiments. Guide arms 110 are connected to triangular elements 108 and have rollers 112 which are received in guide track 112*a*. As seen in FIGS. 11A-11D, extension of telescopic arm 102 first folds bed cover 11' into a collapsed condition (FIG. 11C) and then rotates it into its substantially vertical storage position (FIG. 1D). As with the previous embodiment, the force of the motor 104 can be augmented by any of the securement devices discussed with respect to earlier embodiments.

Various changes, alternatives and modifications will become apparent to one of ordinary skill in the art following a reading of the foregoing specification. It is intended that any such changes, alternatives and modifications as fall within the scope of the appended claims be considered part of the present invention.

I claim:

1. Hardware to facilitate storing a pickup truck bed cover which has a plurality of sections that are hingedly interconnected and cover a substantially rectangular truck bed that has a front wall adjacent a cab and a rear wall defined by a tailgate, the pickup truck bed cover having an extended position and a folded position, said hardware comprising
   a) latch means to secure a front edge portion of the pickup truck bed cover in the extended position over a front portion of the pickup truck bed;
   b) pivoting means for facilitating rotation of the pickup truck bed cover in the folded position to a substantially vertical position, said pivoting means including gear means including a plurality of interengaged gear elements to lift and rotate the bed cover in the folded position to said substantially vertical position, said gear elements including a first gear engaging a toothed outer periphery of a semi-circular surface of a pivot arm and a motor driving said first gear in a first rotational direction to rotate said semi-circular surface in an opposite rotational direction to rotate said pivot arm and a first of the plurality of sections onto a second of the plurality of sections;
   c) securing means holding said pickup truck bed cover in said substantially vertical position against movement;
   d) cable means attached to a first end of the first of a plurality of sections and brake means to retard movement of the first of said plurality of sections as said first section is folded onto the second of the plurality of sections;
   whereby the pickup truck bed cover can be stored in said substantially vertical position to provide unimpeded access to substantially the entire area of the pickup truck bed.

2. The bed cover hardware of claim 1 wherein said brake means includes a resistance clutch and a rewind motor connected to said cable.

3. The bed cover hardware of claim 1 wherein said securing means comprises means to attach an upper portion of the bed cover in said substantially vertical position to a portion of the truck's roof.

4. The bed cover hardware of claim 1 wherein said securing means comprises means to fix the position of an upper portion of the bed cover by a tie rod attached to a portion of the truck bed selected from the group consisting of a central portion of a sidewall thereof and a portion of the sidewall adjacent a rear wall of the truck bed.

5. The bed cover hardware of claim 1 wherein said pivoting means further comprises means for facilitating rotation of the pickup truck bed cover in the folded position to a position past vertical in which said bed cover is leaning atop a roof portion of the truck.

6. The bed cover hardware of claim 5 wherein said pivoting means comprises elevating means to elevate a forward end of the bed cover in the folded position to permit rotation of the bed cover to said position past vertical.

7. The bed cover hardware of claim 6 wherein said elevating means comprises a slide connected to the pickup truck bed cover and a guide connected to an inner side wall of the pickup truck bed.

8. The bed cover hardware of claim 5 wherein said latch means comprises first pivoting hook means attachable to the truck bed cover.

9. The bed cover hardware of claim 8 wherein said first pivoting hook means comprises two hooks, one attached to either front side portion of the bed cover.

10. The bed cover hardware of claim 8 wherein said latch means further comprises bracket means attached to right and left portions of the forward sidewalls of the truck bed.

11. The bed cover hardware of claim 1 wherein said elevating means comprises gear means including a plurality of interengaged gear elements to lift and rotate the bed cover in the folded position to said substantially vertical position.

12. The bed cover hardware of claim 11 wherein said gear means includes ratchet means to rotate said interengaged gear elements thereby elevating the bed cover to said substantially vertical position.

13. The bed cover hardware of claim 11 wherein said gear means includes a lever device to rotate said interengaged gear elements thereby elevating said bed cover to said substantially vertical position.

14. The bed cover hardware of claim 11 wherein said gear elements include a first gear engaging a toothed outer periphery of a semi-circular surface of a pivot arm and a motor driving said first gear in a first rotational direction to rotate said semi-circular surface in an opposite rotational direction to rotate said pivot arm and a first of the plurality of sections onto a second of the plurality of sections.

15. The bed cover hardware of claim 14 further comprising a telescoping push rod engaging a recess in a nether surface of said second of the plurality of sections to rotate the folded bed cover to said substantially vertical position.

16. Hardware to facilitate storing a pickup truck bed cover which has a plurality of sections that are hingedly interconnected and cover a substantially rectangular truck bed that has a front wall adjacent a cab and a rear wall defined by a tailgate, the pickup truck bed cover having an extended position and a folded position, said hardware comprising
   a) latch means including first pivoting hook means to secure a front edge portion of the pickup truck bed cover in the extended position over a front portion of the pickup truck bed comprising two hooks, one attached to either front side portion of the bed cover and bracket means attached to right and left portions of the forward sidewalls of the truck bed;
   b) pivoting means for facilitating rotation of the pickup truck bed cover in the folded position to a substantially vertical position;
   c) securing means holding said pickup truck bed cover in said substantially vertical position against movement;
   d) spring-biased locking bolt means pivotally attached to said bracket means engageable with said pivoting hook means to secure the bed cover in the extended position over the front portion of the truck bed.

17. The hardware of claim 16 wherein said spring biased locking bolt means is generally z-shaped with one arm twisted out of plane.

\* \* \* \* \*